(12) United States Patent
Ballantine et al.

(10) Patent No.: US 8,535,836 B2
(45) Date of Patent: Sep. 17, 2013

(54) METHOD OF OPERATING A FUEL CELL SYSTEM WITH BYPASS PORTS IN A FUEL PROCESSING ASSEMBLY

(75) Inventors: Arne Ballantine, Palo Alto, CA (US);
Virpaul Bains, San Ramon, CA (US);
Kirsten Burpee, San Jose, CA (US);
Brent Cheldelin, San Carlos, CA (US);
David Trevisan, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 922 days.

(21) Appl. No.: 12/458,355

(22) Filed: Jul. 8, 2009

(65) Prior Publication Data

US 2011/0008687 A1 Jan. 13, 2011

(51) Int. Cl.
*H01M 8/06* (2006.01)

(52) U.S. Cl.
USPC .............................. 429/410; 95/135

(58) Field of Classification Search
USPC .......................... 429/410; 95/135
See application file for complete search history.

(56) References Cited

U.S. PATENT DOCUMENTS

| | | | |
|---|---|---|---|
| 7,067,208 B2 | 6/2006 | Gottmann et al. | |
| 7,422,810 B2 | 9/2008 | Venkataraman et al. | |
| 2003/0113598 A1* | 6/2003 | Chow et al. | 429/17 |
| 2004/0202908 A1 | 10/2004 | Schmitz et al. | |
| 2006/0188763 A1* | 8/2006 | Bai et al. | 429/22 |
| 2007/0196704 A1 | 8/2007 | Valensa et al. | |
| 2008/0096087 A1 | 4/2008 | Kulakov | |
| 2008/0213141 A1 | 9/2008 | Pinchot | |

FOREIGN PATENT DOCUMENTS

| | | |
|---|---|---|
| CA | 2653441 A1 | 1/2008 |
| EP | 0817298 A1 | 1/1998 |

OTHER PUBLICATIONS

U.S. Appl. No. 11/656,006, filed Jan. 22, 2007, Sridhar et al.
International Preliminary Report on Patentability issued in PCT Application PCT/US2010/041238, mailed on Jan. 19, 2012.
Korean Intellectual Property Office (ISA/KR). International Search Report and Written Opinion, International Application PCT/US10/41238. Mar. 2, 2011.

* cited by examiner

*Primary Examiner* — Ula C Ruddock
*Assistant Examiner* — Frank Chernow
(74) *Attorney, Agent, or Firm* — The Marbury Law Group PLLC

(57) ABSTRACT

Embodiments relate to a fuel cell system. In an embodiment, the fuel cell system includes advanced leak test capabilities. In another embodiment, the fuel cell system includes a system to bypass one or more separation units while permitting the fuel cell system to continue to produce electricity. In another embodiment, the fuel cell system includes an alignment system that permits ease of alignment when a fuel cell module is installed proximate a fuel processing module. In another embodiment, the fuel cell system includes a system of supplying auxiliary fuel from a mobile auxiliary fuel supply. In an embodiment, one or more or all of these embodiments may be practiced together in combination.

21 Claims, 22 Drawing Sheets

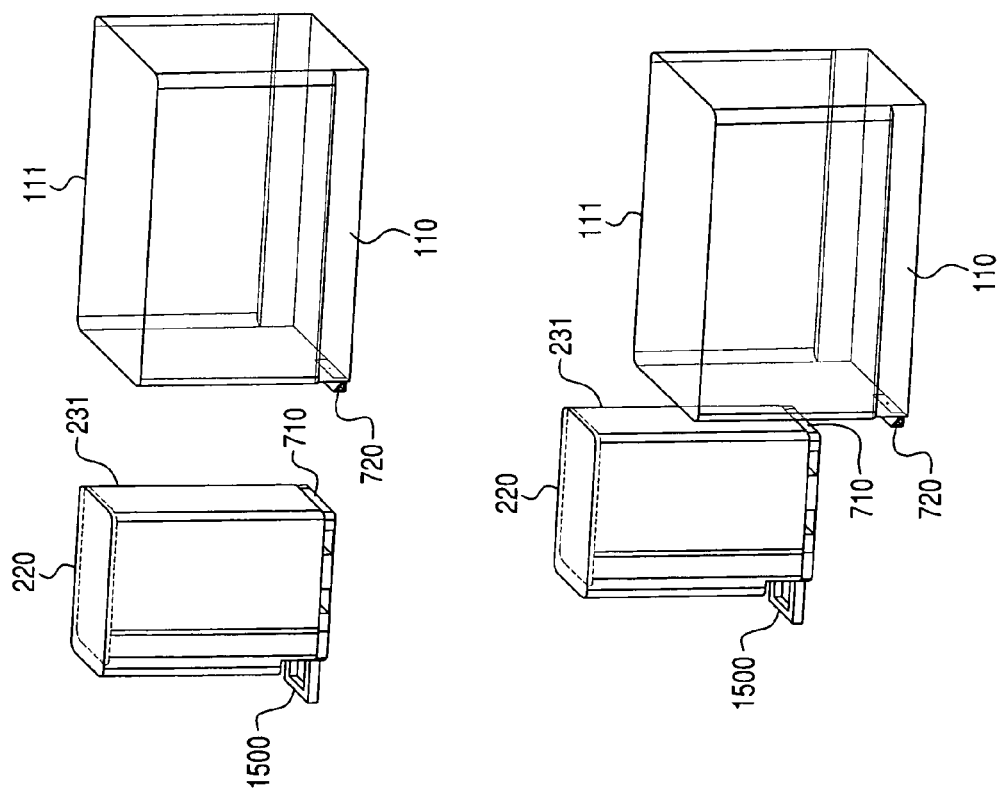

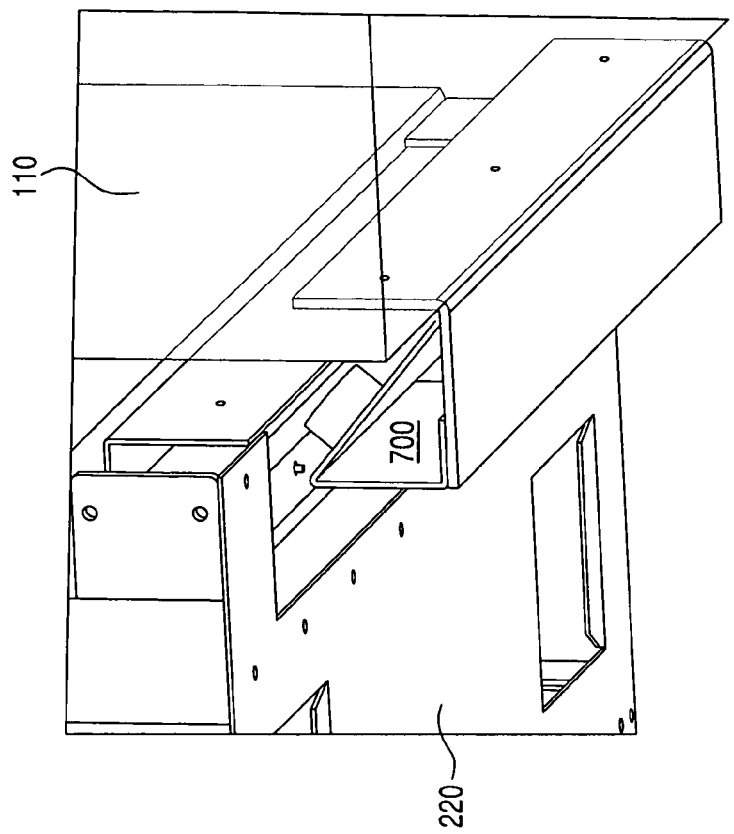
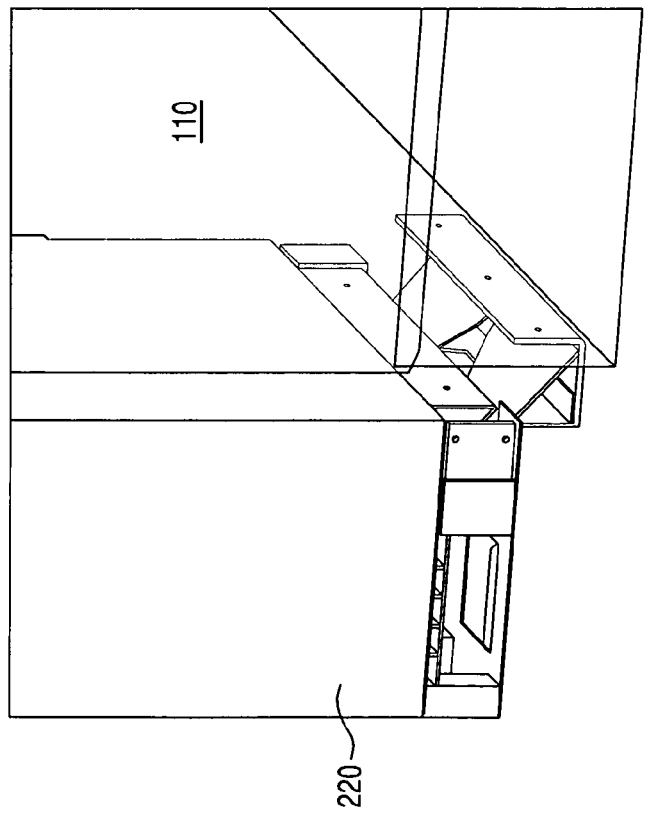
Fig. 14a

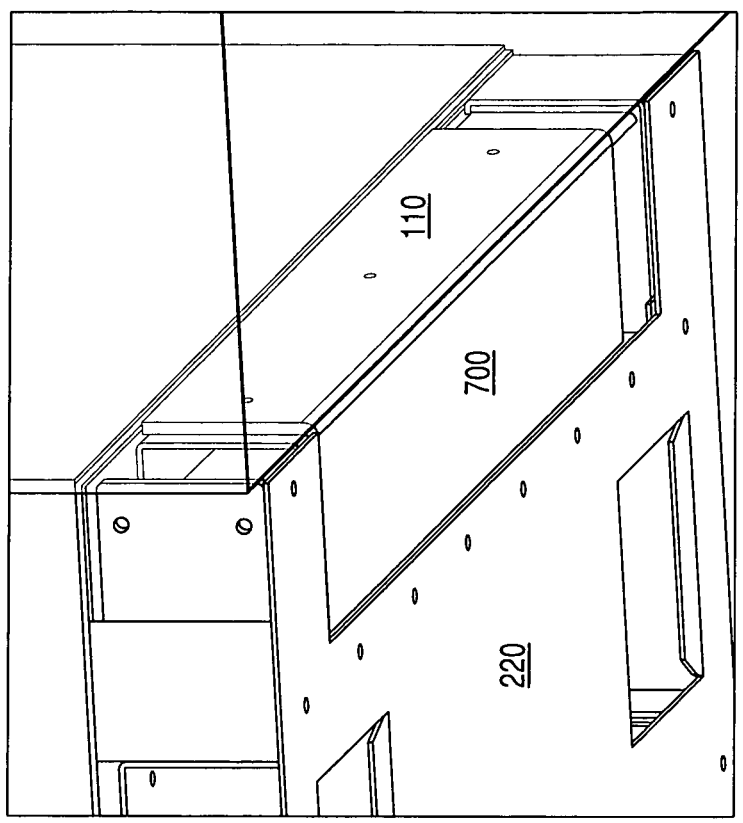
Fig. 14b
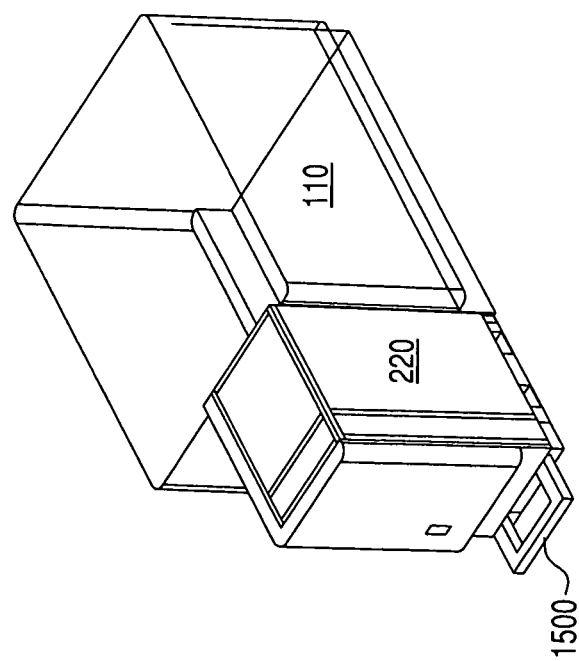

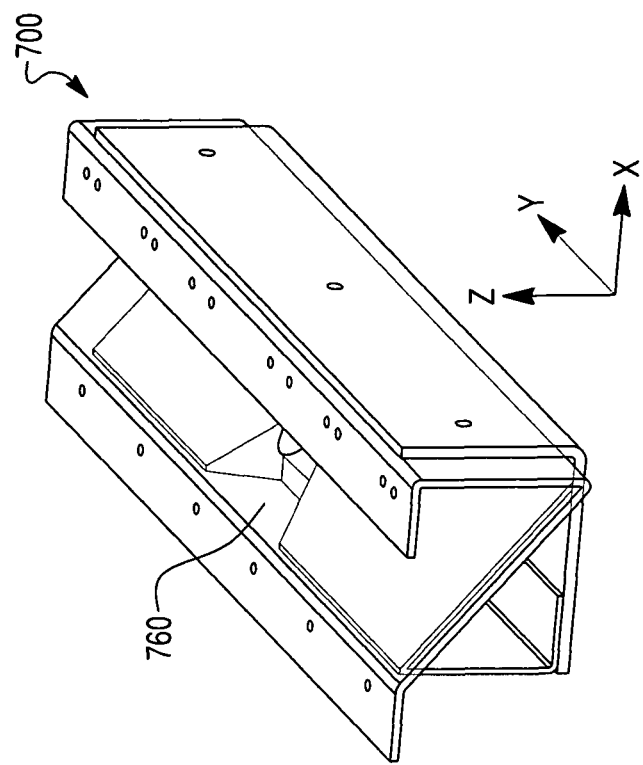
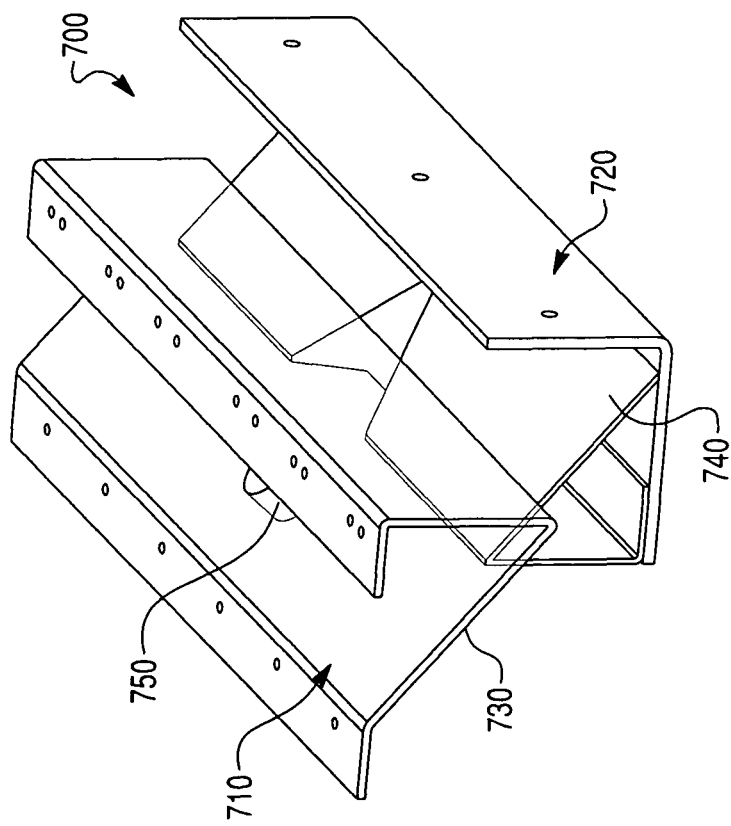
Fig. 17

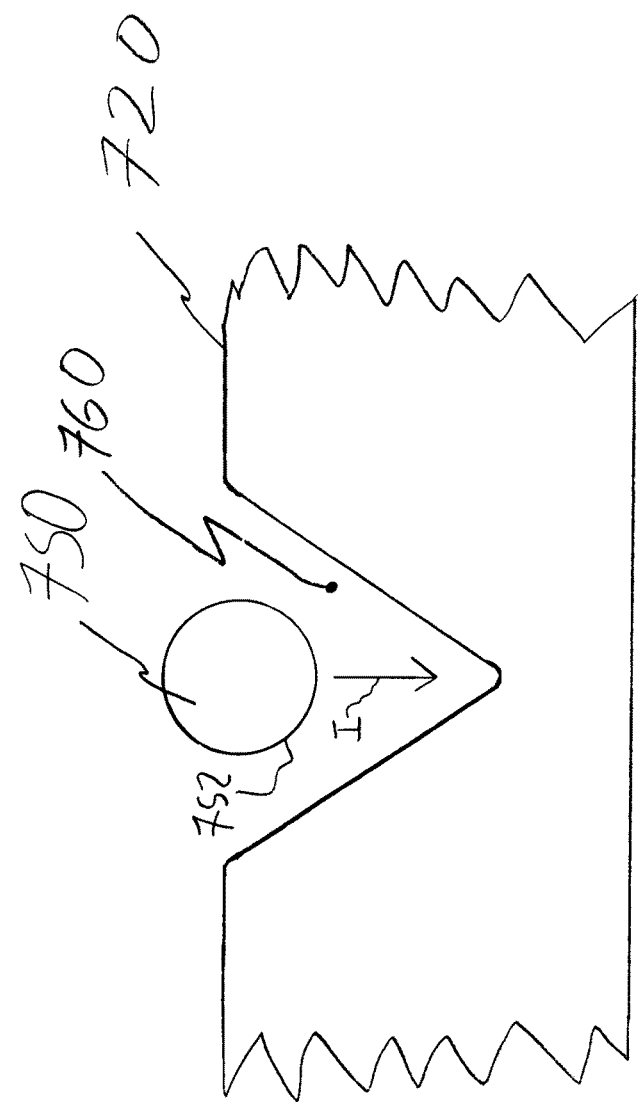

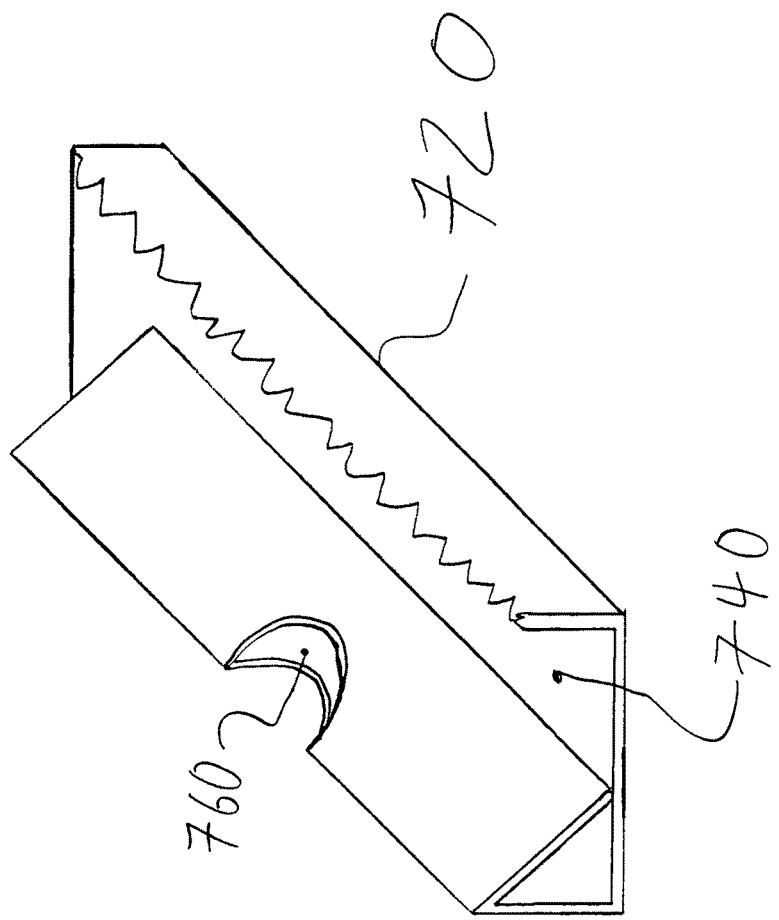

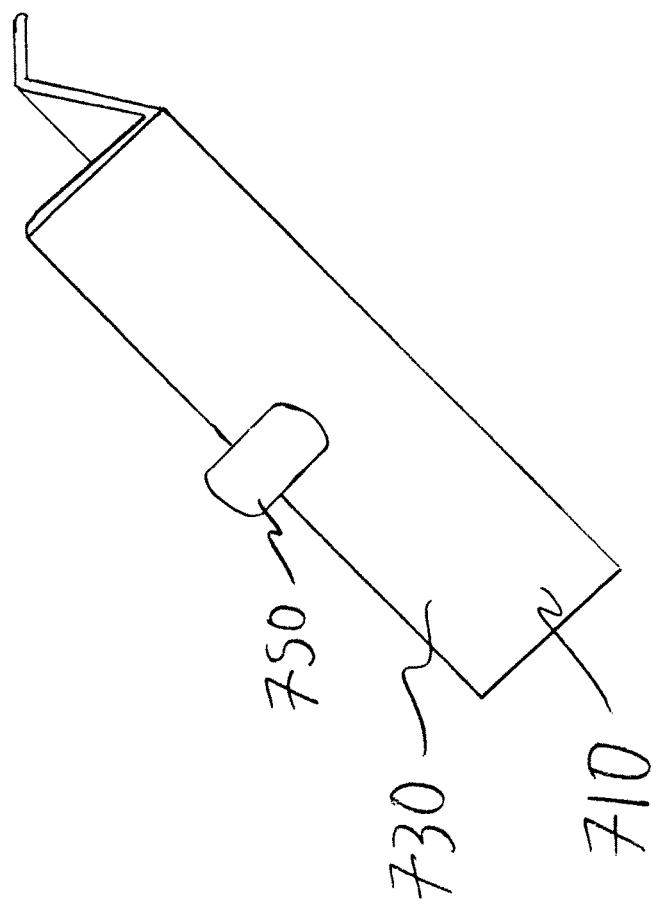

METHOD OF OPERATING A FUEL CELL SYSTEM WITH BYPASS PORTS IN A FUEL PROCESSING ASSEMBLY

Embodiments of the invention are directed towards fuel cell systems, such a modular fuel cell systems with quick connects.

SUMMARY

One embodiment of the invention provides a fuel cell system, comprising a fuel cell assembly comprising at least one fuel cell stack, and a fuel processing assembly comprising a processing section adapted to purify fuel for a fuel cell stack. The fuel cell assembly is connected to the fuel processing assembly by at least one quick connection device. In one embodiment, a fuel processing module that process fuel to be used by a fuel cell stack is a distinct component of the fuel cell system, and a fuel cell module that receives the processed fuel and includes a fuel cell stack is a distinct component of the fuel cell system and each module is provided in a separate housing. In another embodiment, a unitary fuel cell system is provided where the units/assemblies of the system are not modular (i.e., not "easily" removable and installable from each other and/or share the same housing).

BRIEF DESCRIPTION OF THE DRAWINGS

FIG. 12-14b depict schematics presenting three dimensional views of movement of the fuel cell module to the fuel processing module.

FIGS. 17-21 depict schematics of configurations of an alignment system according to an embodiment.

DETAILED DESCRIPTION OF SOME EMBODIMENTS

Auxiliary Fuel Supply

Figure 1:
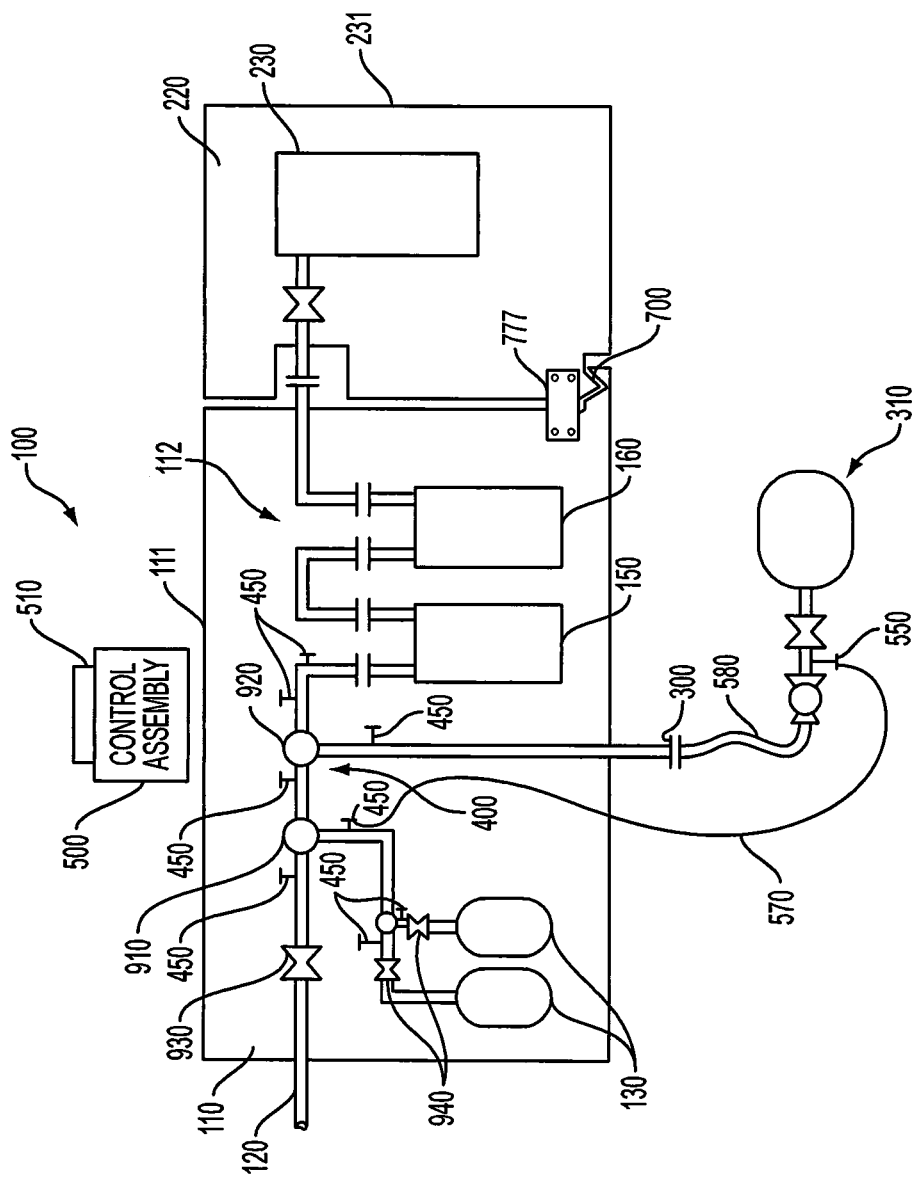
FIG. 1 depicts a schematic of a fuel cell system according to an embodiment.

In a first embodiment, as may be seen in FIG. 1, there is a fuel cell system 100. The fuel cell system 100 includes a fuel cell module 220 including a fuel cell stack 230. It should be understood that module 220 may contain a plurality of fuel cell stacks and/or a plurality of columns, as, by way of example, is disclosed in U.S. patent application Ser. No. 11/656,563, filed on Jan. 23, 2007, to Jeroen Valensa, entitled Integrated Solid Oxide Fuel Cell and Fuel Processor, the contents of that application pertaining to the fuel cell module in general and the fuel cell stacks and columns being incorporated by reference herein in its entirety, as, in an embodiment, the fuel cell module may include some or all of the features disclosed therein. The system 100 includes a fuel processing module 110 that is adapted to processes a fuel (e.g., natural gas, etc.) for the fuel cell stack 230. In an exemplary embodiment, the fuel processing module 110 includes a fuel processing section 112 including separation units 150, 160 that are adapted to separate unwanted components (e.g., sulfur, etc.) from the fuel and trap the unwanted components in the separation units 150, 160, so that the fuel is processed for use in the fuel cell stack 230.

The fuel cell module 220 is configured to be placed into fluid communication with the fuel processing module 110 so that the fuel cell module 220 may receive the processed fuel from the fuel processing module 110. In an embodiment, the fuel cell module 220 is adapted to be installed and removed, as a module, to/from the fuel processing module 110. In other embodiments, the fuel cell system 100 is a unitary component comprising a fuel cell assembly and a fuel processing assembly.

The fuel processing module 110 of the fuel cell system 100 includes a processing section 112 adapted to process fuel for the fuel cell stack 220 in the fuel cell module 230. In an exemplary embodiment, the fuel processing module 110 includes a fuel inlet conduit, such as a natural gas inlet 120, adapted to be connected to an infrastructure natural gas supply (not shown), such as by way of example only, a city natural gas system, exterior to the fuel processing module 110. In an exemplary embodiment, the fuel processing module 110 includes one or more back up fuel tanks 130 containing propane (non-mobile auxiliary fuel supplies), for use in the event that the natural gas supply is not available. It is noted that in addition to natural gas and propane, the fuel cell system 100 may utilize ethanol, alcohol or hydrogen, etc. (other hydrocarbon fuels may be utilized, and other liquid fuels such as ammonia may be used). Any suitable fuel may be utilized in the fuel cell system 100. Accordingly, any such suitable fuel may be received into the inlet 120 and/or stored in the back-up tanks 130 for use in the system 100. In an embodiment, compressed natural gas received through the inlet 120 may be stored in the tanks.

In the embodiment of FIG. 1, the processing section 112 is adapted to process natural gas received through the inlet 120 into fuel for the fuel cell stack 230. Also, the processing section 112 is adapted to process propane contained in the propane tank(s) 130 into fuel for the fuel cell stack 230. As may be seen in FIG. 1, valve 910 alternately directs natural gas and propane to valve 920, through which the directed natural gas/propane enters the processing section 112.

In the embodiment of FIG. 1, the fuel processing module 110 includes an auxiliary fuel inlet 300, which, in an exemplary embodiment, is a quick connect/disconnect (also referred to as a quick connection/disconnection) fitting, adapted to be connected to a temporary fuel supply. As may be seen in FIG. 2, the temporary fuel supply is a mobile auxiliary fuel storage device 310 including tanks 320 containing propane and/or natural gas and/or any other acceptable fuel which may be processed into fuel for a fuel cell stack by the processing section 112, including but not limited to those discussed above. In some embodiments, the temporary fuel supply (e.g., the mobile auxiliary fuel storage device 310) is used when fuel from the infrastructure received through inlet 120 is not available and/or when fuel from tank(s) 130 is not available, for whatever reason (e.g., maintenance, depletion, shortage, etc.) In such a situation, the mobile auxiliary fuel storage device 310 may be moved into proximity of the fuel processing module 110, connected to the fuel processing module 110, so that the fuel processing module has an alternate supply of fuel to process in processing section 112. In this regard, the mobile auxiliary fuel storage device 310 is, in essence, in some embodiments, a propane cart comprising one or more tank(s) 320 supported by a wheeled assembly 330. The propane cart 310, once placed into fluid communication with the auxiliary fuel inlet 300, can permit propane in the cart 310 to be transferred to the fuel processing module 110 so that it may be processed by the processing section 112 into fuel for the fuel cell stack 230.

The auxiliary fuel inlet is connected to inlet 120 through valve 920. In some embodiments, valve 920 is not used. Instead, a conduit from valve 910 may extend uninterrupted by a valve to the processing section 112. The quick connect 300 may be fluidly located between valve 910 and the processing section 112. That is, the quick connect 300 may be in direct fluid communication with the valve 910 and/or the processing circuit 112. In some other embodiments, valve 910 and/or valve 930 are not present.

In some embodiments, the fuel processing module 110 is adapted to transfer fuel (e.g., propane, natural gas, etc.) received through the auxiliary fuel inlet 300 to the fuel processing section 112, through valve 920. This transfer of fuel by the module 110 can be accomplished either because the fuel stored in the tanks 320 is at a sufficiently high pressure so that the fuel stored in the tanks 310 flows to the fuel processing section 112 and/or because the tanks 320 are valved closed. During operation, the fuel processing section 112 processes the received auxiliary fuel into fuel for the fuel cell stack 230.

Figure 2:
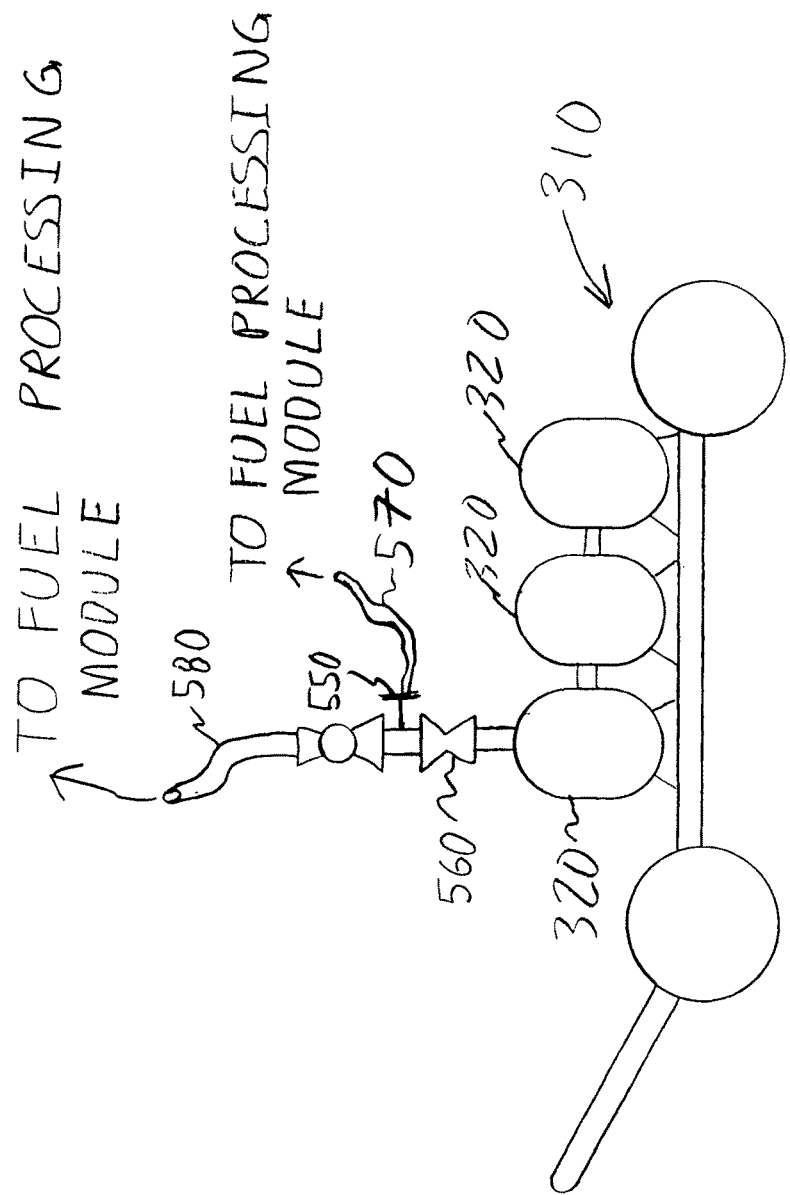
FIG. 2 depicts a schematic of an auxiliary fuel cart according to an embodiment.

In the embodiment depicted in FIGS. 1 and 2, the auxiliary fuel inlet 300 is a quick connection fitting (inlet). Thus, an operator may quickly connect and disconnect the cart 310 to and from the module 110.

Specific use of the propane cart 310 in conjunction with the fuel processing module 110 will now be discussed, including how such use impacts and is made compatible with the various fail-safe devices/emergency shut down systems of the fuel cell system 100. For example, powering down (which includes shutting down) the fuel cell stack 230 in the event of a perceived shortage of fuel being supplied to the processing section 112. In this regard, details will be provided regarding the valving and fuel circuits used to direct fuel flow in the processing module 110, and details will be provided regarding sensors (e.g., pressure sensors, pressure switches) and control systems/devices used to monitor the fuel cell system 100 and to automatically power down (shut down) the fuel cell stack 230.

As may be seen in FIG. 1, the fuel processing module 110 includes a fuel circuit (e.g., fuel/fluid conduits) 400 that is adapted to variably place (manually and/or automatically) the natural gas inlet 120 into fluid communication with the processing section 112 by manipulating valves 910 and 920 and/or shutting/opening valve 930. The module 110 is adapted to variably place (manually and/or automatically) the propane tank(s) 130 into fluid communication with the processing section 112 by manipulating valves 910 and 920 and/or by opening valve(s) 940. The fuel processing module 110 is further adapted to halt fuel (manually and/or automatically) communication between the natural gas inlet 120 and the processing section 112 by manipulating valves 910 and 920 and/or shutting valve 930 and halt fluid communication between the propane tank(s) 130 and the processing section 112 by manipulating valves 910 and 920 and/or shutting valve(s) 940 when a fluid is present in the auxiliary fuel inlet 300 meeting fuel characteristics, such as having a sufficient pressure and composition (e.g., such as being propane, natural gas, etc.).

In an exemplary embodiment, the fuel processing module 110 includes a sensor assembly including an array of sensors used to monitor the fuels in the circuit 400. In an exemplary embodiment, the fuel processing module includes a sensor assembly including a plurality of sensors 450. The sensor assembly is adapted to sense one or more of (i) a first characteristic (e.g., pressure, flow rate, etc.) of the fuel located between the natural gas inlet 120 and the processing section 112 and a second characteristic of the fuel located between the propane tank(s) 130 and the processing section 112 (e.g., pressure, flow rate, etc.), or (ii) a third characteristic (e.g., pressure, flow rate, etc.) of the fuel located upstream from the processing section 112 and downstream from the natural gas inlet 120 and the propane tank(s) 130 (depending on the valving utilized). In an exemplary embodiment, the sensor assembly includes one or more pressure switches, and the first, second and third characteristics are pressure.

The sensor assembly is adapted to output a first signal indicative of the sensed first characteristic, the sensed second characteristic and/or the sensed third characteristic.

Using the sensor assembly, the fuel cell system 100 may monitor the states of fuel in the fuel cell system 100. In this regard, the fuel cell system may include a control assembly 500. Assembly 500 may comprise a general or specific purpose computer or a dedicated control device or circuit. Assembly 500 may be located in a separate power conditioning module or in module 110. Assembly 500 is adapted to receive a signal from the sensor assembly (by wire, wireless communication, light, electromagnetic wave and/or mechanical linkage, etc) and power down or otherwise shut down the fuel cell stack if the received signal is indicative of, for example, a deficiency in the monitored pressures. In other embodiments, the received signal is relayed from an intermediate component that received the first signal and transferred the first signal and/or evaluated the first signal and outputted a second signal to the controller 500 that is indicative of the sensed first characteristic or the sensed second characteristic or the sensed third characteristic. If the received signal is indicative of a deficiency of fuel being received into the fuel circuit 400 from at least one of the natural gas inlet 120 or the propane tank(s) 130, the control assembly will likewise power down the fuel cell stack 230.

By way of example, if the control assembly 500 receives a signal indicating that one or more of the pertinent sensors 450 sense a pressure in the circuit 400 indicating a deficiency and/or lack of fuel flowing from the inlet 120 and/or the tank(s) 130, the control assembly 500 will shut down the fuel cell stack 230. By way of example, if valve 930 is shut and valve(s) 940 are shut, the pressure sensors 450 upstream of those valves should sense a decrease in pressure in the circuit 400. In such a scenario, the control assembly 500 would shut down the fuel cell stack 230.

In a specific exemplary embodiment, the control assembly 500 includes logic such that it is adapted to identify the occurrence of a deficiency of at least one of (i) fuel located between the natural gas inlet 120 and the processing section 112, (ii) fuel located between the propane tank(s) 130 and the processing section 112, or (iii) fuel located upstream from the processing section 112 and downstream from the natural gas inlet 120 and the propane tank(s) 130. In this specific exemplary embodiment, the control assembly 500 is adapted to power down the fuel cell stack 230 if the control assembly 500 identifies the occurrence of at least one of these deficiencies.

An embodiment includes a device which overrides the fail-safe system described above in the event that the propane cart 310 is connected to the processing module 110 through outlet hose 580 which includes a quick connect fitting to connect to a quick connect fitting at inlet 300, and thus is able to supply sufficient amounts of auxiliary fuel (propane or other appropriate hydrocarbon source, etc.) to the processing section 112. Thus, in some embodiments, the fuel cell stack 230 need not power down in the event that there is a lack of supply of fuel from inlet 120 and/or a lack of supply of fuel from tanks 130. Accordingly, in some embodiments, the fuel cell system 100 includes an override system, which, in some embodiments, can be part of the control assembly 500 and in other embodiments separate from the control assembly 500, adapted to permit a user of the fuel cell system 100 to prevent the control assembly 500 from automatically powering down/shutting down the fuel cell system in such an eventuality. Alternatively, the override system modifies a warning that the fuel cell stack should be powered down (e.g., cancelling a siren while permitting a warning light to blink, etc.), in the case of a manually operated shut down system). That is, in some embodiments, the fuel cell system 100 includes an override system adapted to permit a user of the fuel cell system 100 to prevent the control assembly 500 from powering down the fuel cell system 100 when the received signal is indicative of a deficiency in received fuel for the processing section 112 (e.g., negative pressure).

A user may want to override the automatic power down system in the event that the user has provided the fuel cell system 100 with another back-up supply of fuel. That is, even though the primary fuels normally supplied to the processing section 112 (e.g., from the natural gas infrastructure through inlet 120 and the fuel from tanks 130) are not available (thus "normally" triggering the automatic power down because one or more of the sensors 450 are not sensing a positive pressure), in the event of maintenance and/or catastrophe, etc., if another source of fuel may be supplied to the fuel processing section 112 (e.g., from the cart 310), it is unnecessary to power down the fuel cell stack 230.

In an exemplary embodiment, the override system includes providing to the control assembly 500 an output indicative of fuel pressure flowing from fuel tank(s) 320 of the cart 310. Such an embodiment may include blocking an output or otherwise preventing an output of one or more sensors 450 from reaching the control assembly 500. By way of example, the output system may utilizes an output of a fuel pressure sensor 550 of cart 310 which is directed into the sensor assembly of the fuel processing module 110. The fuel pressure sensor 550 senses the fuel pressure of fuel passing through valve 560 as the fuel is transferred from the tank(s) 320 of the cart 310 to the fuel processing module 110. The output of this sensor 550 is relayed through output cable 570 to the sensor assembly of the fuel processing module. In an embodiment, one or more of the sensors 450 and/or other components of the sensor assembly (e.g., an override board with a receptacle in electronic communication with the sensor assembly) is adapted to receive the output cable 570. By way of example, a sensor 450 may be configured such that it can receive an output plug of the output cable 570. When the output plug of the output cable 570 is received by the sensor 450, the sensor 450 outputs the output from the output cable 570 to the control assembly 500, as opposed to outputting a signal indicative of the pressure sensed by that sensor. In another embodiment, both signals from sensor 550 and sensor 450 are received, but signal 550 is encoded with a flag to tell the fuel cell system 100 to disregard other signals other than the signal from sensor 550 and/or give priority to the signal from sensor 550.

In another embodiment, the output plug of the output cable 570 corresponds to the output plug(s) of one or more of the sensors 450. In this regard, in an exemplary embodiment, the sensors 450 of the sensor assembly communicate with the control assembly 500 through a wiring harness having respective plugs which are plugged into the respective sensors 450. The operator removes a plug of a wiring harness connecting to an output of one of the sensors 450, and plugs the output plug of output cable 570 into the removed plug of the wiring harness. If the operator does this sufficiently fast (e.g., less than the predetermined time period for control assembly 500 to power down the fuel cell stack 230 in the event that no signal is received from a pressure sensor), or if the fuel cell system 110 is configured to not power down the fuel cell stack 230 in the event that it looses communication with a sensor, the control assembly 500 will not power down the fuel cell stack. Thus, the sensor assembly receives the output of the pressure sensor 550 instead of the output of the sensor 450. Accordingly, even though the sensor 450 may be sensing an insufficient fuel pressure, the sensor assembly still receives output indicative of adequate pressure at that sensor (positive pressure), albeit due to the output from sensor 550.

In another embodiment, the output of the sensor 550 is not fed into the sensor assembly of the fuel processing module. Instead, it is fed into the control assembly 500, and the control assembly, recognizing that it is receiving output from the cart 310, disregards any signals from the pressure sensors 450 indicative of a lack of pressure at those sensors, and the control assembly 500 does not power down the fuel cell stack 220 upon receipt. In this regard, the fuel cell system may include at least one interface 510 located on the control assembly 500 or on the fuel processing module 110 or elsewhere, as appropriate, configured to receive the output plug of output cable 570. Alternatively or in addition to this, receipt of the output plug of output cable 570 may block signals from the other sensors 450 from reaching the pertinent logic units of the control assembly 500.

In an embodiment, there is an override assembly built into the fuel cell system 100 that does not need to receive the output plug of the cable 570, but still has some and/or all of the functionality of the system receiving the output plug of the cable 570, and is adapted to prevent the control assembly 500 from powering down the fuel cell in the event that insufficient fuel pressure exists at one or more sensors of the sensor assembly. In this regard, in some embodiments, the fuel processing assembly 110 need not receive the cable 570 for operation of the override system. The override system can include an interface 510 on the fuel cell system 100 at the control assembly 500 and/or at the fuel processing module 110 and/or elsewhere, as appropriate, configured to receive input from a user. Such an interface may be a keyboard, a push and/or pull button, a switch, etc., configured to receive input from a user. The user "inputs" his or her desire to override or otherwise prevent the automatic power down/shut down routine in the event that a deficiency of the fuel supply is perceived. In other embodiments, the user can disable various components in the fuel cell system 100 to override/prevent the automatic power down/shut down routine.

An embodiment utilizing the auxiliary fuel cart permits items such as fuel meters or regulators to be replaced or serviced while the fuel cell system 100 continues to produced electricity, even though such replacement/service cannot be done with a simple by-pass at the location of the utility equipment. The auxiliary fuel cart can alleviate the problems of time off-line impacting customer availability (especially in situations where customers need very high system availability (such as the case of data-centers or hospitals)), and system can cool down (which can increase the off-line period because the system must be re-heated in order to once again produce full power efficiently). In an embodiment, the auxiliary fuel source from the cart is supplied at target pressure such that the supply of fuel to the fuel cell stack is seamless. In an embodiment, the auxiliary fuel source contained in the tanks of the mobile cart may be any convenient fuel such as propane, compressed natural gas, ethanol, or hydrogen. Other hydrocarbon fuels may be utilized. Other liquid fuels such as ammonia may be used. In cases where full power is to be generated while using the temporary fuel source, it may be desired to use a liquid fuel source because of the advantage in fuel energy density.

The following is an exemplary sequence detailing use of the auxiliary fuel art according to an embodiment, where the order of the steps may be changed, and additional steps may be added and some of the listed steps may be subtracted. The fuel cart 310, or other alternate fuel supply, is brought to the fuel processing module 110. The output hose 580 of the cart 310 is connected to the inlet 300 via a quick connection fitting at inlet 300. Cable 570 is connected to the sensor assembly or the interface 510. A valve of the fuel cart 310 is opened so that fuel may transfer from the fuel cart 310 to the processing module 110. Fuel supply from the natural gas inlet 120 and/or from tanks 130 to the fuel processing section 120 is cut-off, while fuel from the cart 310 is received into the processing section 112, and the pressure sensor 550 outputs a signal through cable 570 to the processing module 110 indicative of a positive fuel pressure. The control assembly 500 does not power down the fuel cell stack 220 even though fuel pressure at one or more of the sensors 450 is negative. Fuel supply from the natural gas inlet 120 and/or from tanks 130 to the fuel processing section 120 is started, and the valve on the cart 310 is shut. Output hose 580 is disconnected from inlet 300 and cable 570 is disconnected from the fuel processing module 110.

Bypass System

In a second embodiment, a jumper system permits a user of the fuel cell system 100 to bypass desulfurization units of the fuel processing section 112. Specifically, referring to the fuel cell system 100 of FIG. 1, the fuel processing assembly (module) 110, which, as detailed above, is adapted to receive a supply of a first fuel (natural gas, propane, etc.) from an infrastructure system, tanks, carts, etc., purifies (e.g., desulfurizes) the received first fuel (natural gas, etc.) to create a second fuel usable for the fuel cell stack 110. The fuel processing assembly 110 outputs the purified second fuel to the fuel cell stack 230.

In the embodiment depicted in FIG. 1, the fuel processing assembly includes two separation units 150, 160. More units may be included, in some embodiments, as may be seen in FIG. 3 (e.g., separation unit 170). The separation units 150, 160 are adapted to separate unwanted components (e.g., sulfur, etc.) from the received first fuel and trap the unwanted components in the separation units 150, 160. In an exemplary embodiment, the separation units 150, 160 are desulfurization beds. Over time, there may be a need to remove and replace the separation units 150, 160 as they become increasingly "full" of unwanted components. In the embodiment depicted in FIG. 1, the separation units are depicted in a series network. In other embodiments, separation units may be utilized with the fuel cell system 100 in a parallel network and/or in a combination of networks.

This system provides a method for removing and replacing and servicing the separation units while continuously operating the fuel cell system 100 (e.g., continuously supplying purified fuel to the fuel cell stack 230). In this regard, the separation units 150, 160 and the fuel cell system 100 are such that the fuel cell system 100 can operate using less than a full component of separation units (e.g., one unit if two units constitute a full component of units, one or two units if three units constitute a full component, etc.), at least for a limited time (such as the time it takes to replace a separation unit or service a separation unit).

Figure 3:
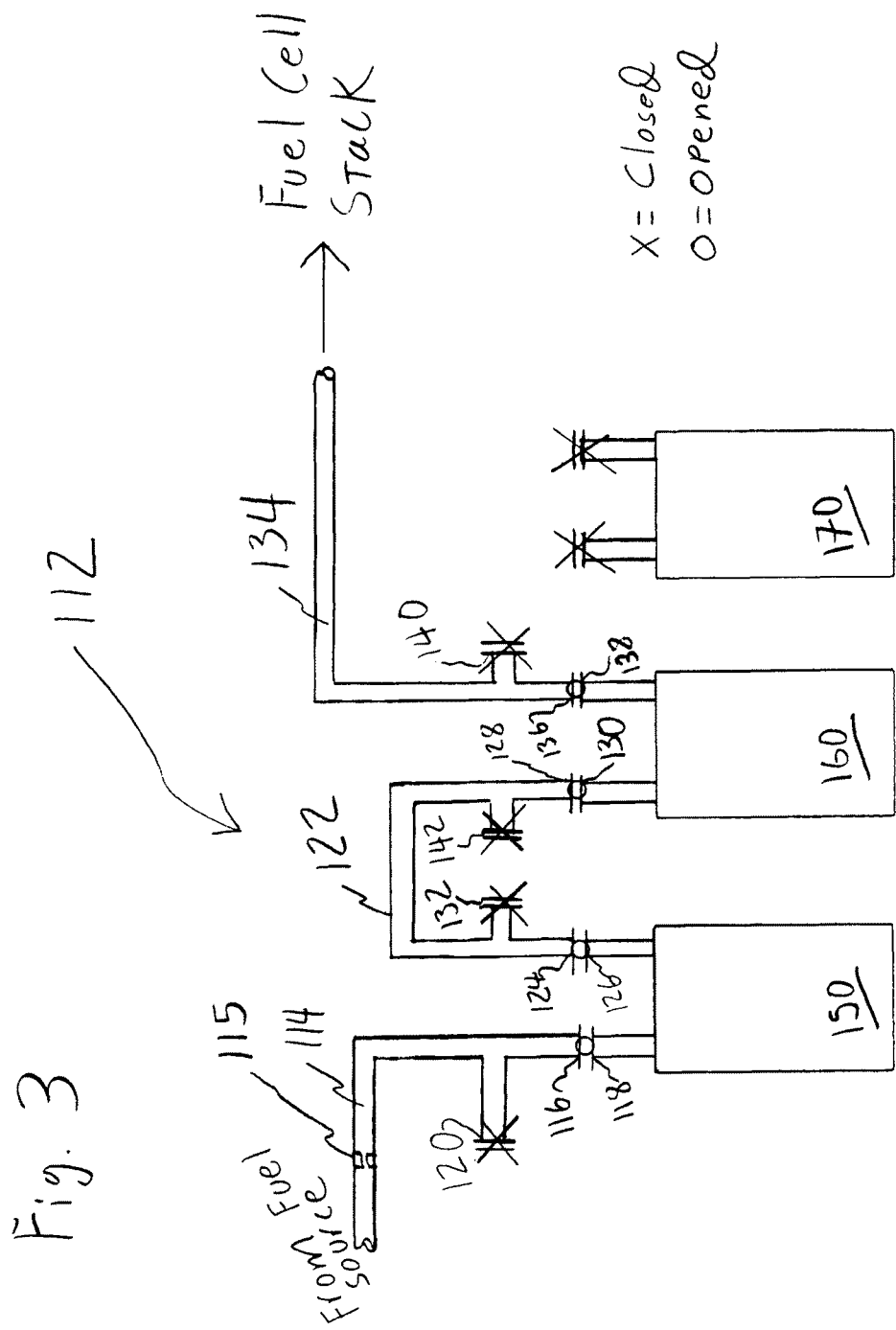
FIG. 3 depicts a schematic of a fuel processing section according to an embodiment.

Referring to FIG. 3, which is an exploded and detailed view of the fuel processing section 112 of FIG. 1, the fuel processing assembly (or module) 110 includes a first fuel input conduit 114 adapted to direct the first fuel (e.g., natural gas from infrastructure and/or natural gas that has already passed through a separator, propane from a propane tank and/or propane that has already passed through a separator, etc.) to the first separation unit 150, the first fuel input conduit 114 including a first outlet 116 adapted to be connected to an inlet 118 of the first separation unit 150, and a first port assembly 120. The first outlet 116 is fluidly connected to the first port assembly 120 (which includes the port itself and the piping connecting the port to the first fuel input conduit 114, if any, etc.) and removably connected to the first separation unit.

The fuel processing assembly 110 further includes a first conduit 122 adapted to direct fuel from the first separation unit 150 to the second separation unit 160, placing those units in series (although other conduit units may be implemented where the units are in parallel). The first conduit 122 includes a first inlet 124 adapted to be removably connected to an outlet 126 of the first separation unit 150, a second outlet 128 adapted to be removably connected to an inlet 130 of the second separation unit 160, and a second port assembly 132 (which includes the port itself and the piping connecting the port to the first conduit 122, if any, etc.) fluidly connected to the first inlet 124 and the second outlet 128. In an embodiment, the second conduit includes an optional additional port assembly 142.

The fuel processing assembly 110 also includes a second conduit 134 adapted to direct fuel flow from the second separation unit 160 to an optional third separation unit 170 and/or directly or indirectly to the fuel cell stack 230. The second conduit 134 includes a second inlet 136 adapted to be removably connected to an outlet 138 of the second separation unit 160, and a third port assembly 140 (which includes the port itself and the piping connecting the port to the second conduit 134, if any, etc.), wherein the second inlet 136 is fluidly connected to the second separation unit 160 and to the third port assembly 140.

In an embodiment, the first port assembly 120 is adapted to be opened when the first outlet 116 is closed, the second port assembly 132 is adapted to be opened when at least one of the first inlet 124 is closed or the second outlet 128 is closed. In an embodiment, the third port assembly 140 is adapted to be opened when the second inlet 136 is closed.

Figure 4:
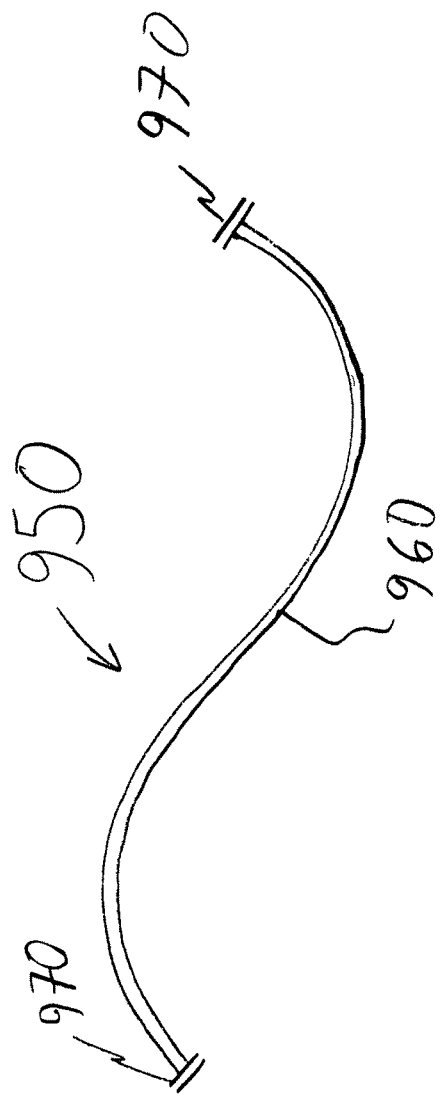
FIG. 4 depicts a schematic of a jumper according to an embodiment.

In an embodiment, to bypass the separation unit(s) that are being serviced or locations where the separation unit(s) were located during replacement, and thus change the flow pattern through the fuel processing section 112, a jumper 950 (FIG. 4) is utilized. The jumper is adapted to connect to the port assemblies. In an embodiment, the jumper 950 is a flexible tube 960 with quick connect fittings 970 on either end, the quick connect fittings 970 being adapted to connect to the port assemblies (120, 132 and 140 (and optionally 142)).

Figure 5:
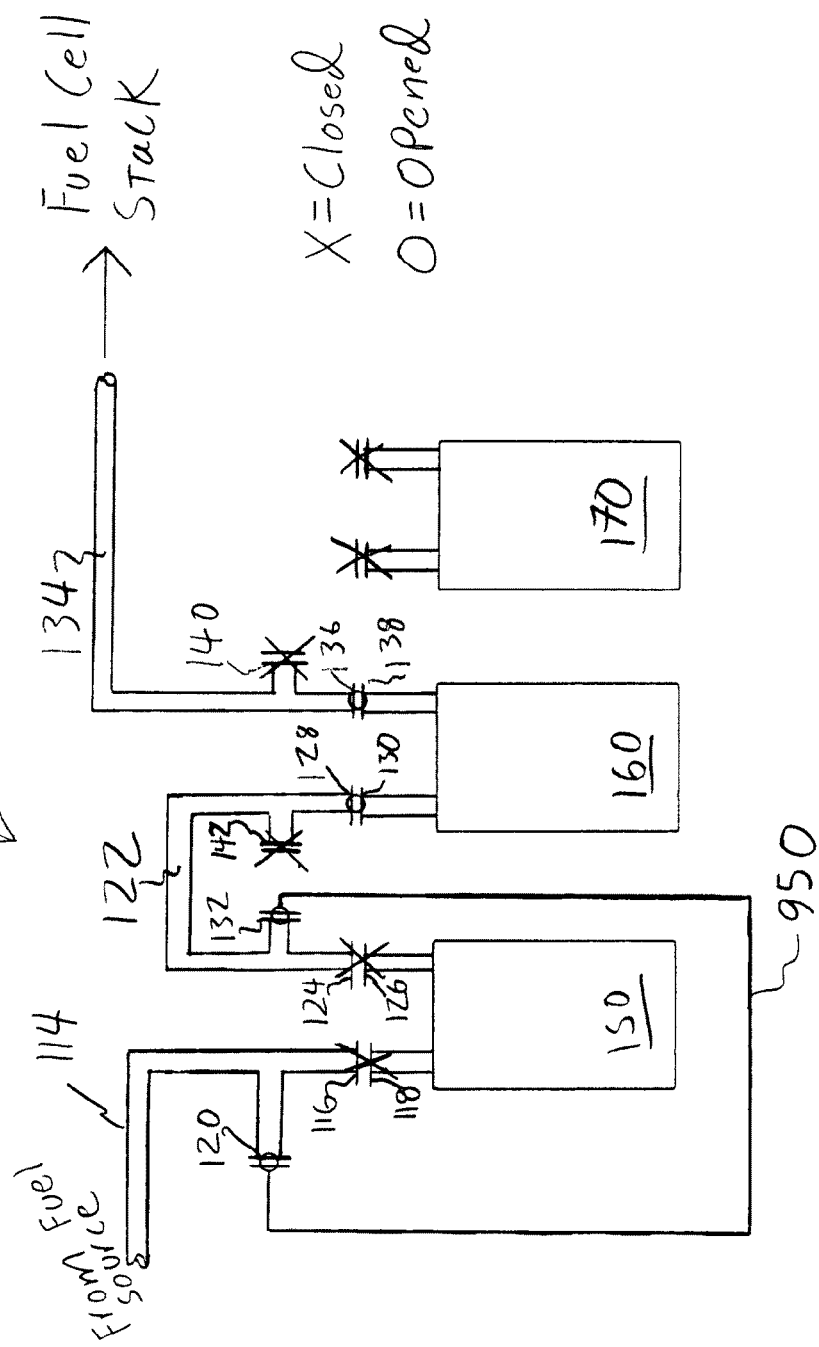
FIGS. 5 and 6 depict a schematic of the jumper of FIG. 4 in use.

Accordingly, to bypass the first separator 150 (or its location), referring by way of example to FIG. 5, the jumper 950 is attached to port assembly 120 and port assembly 132, such that the first port assembly 120 is fluidly coupled to the second port assembly 132. The first port assembly 120 is opened and the first outlet 116 is closed (this may be done manually, automatically, or the components may be coupled together such that the opening of one closes the other, and visa-versa), and the second port assembly 132 is opened and the first inlet 126 is closed (again, this may be done manually, automatically, or the components may be coupled together such that the opening of one closes the other, and visa-versa). In such a configuration, the fuel cell system 100 is thus adapted to transfer the fuel from the fuel input conduit 114 to the first conduit 122 without passing through the first separation unit 150 and also without passing through the first outlet 116 and the first inlet 124. Thus, the first separator 150 may be removed while fuel is transferred from the fuel source (e.g., natural gas infrastructure) to the second separation unit 160, and then to the third separation unit 170 or the fuel cell stack, thus allowing the fuel cell stack to produce electricity because a portion of the fuel processing section 112 has been bypassed (and such bypassing can be easily recognized by an operator).

Figure 6:
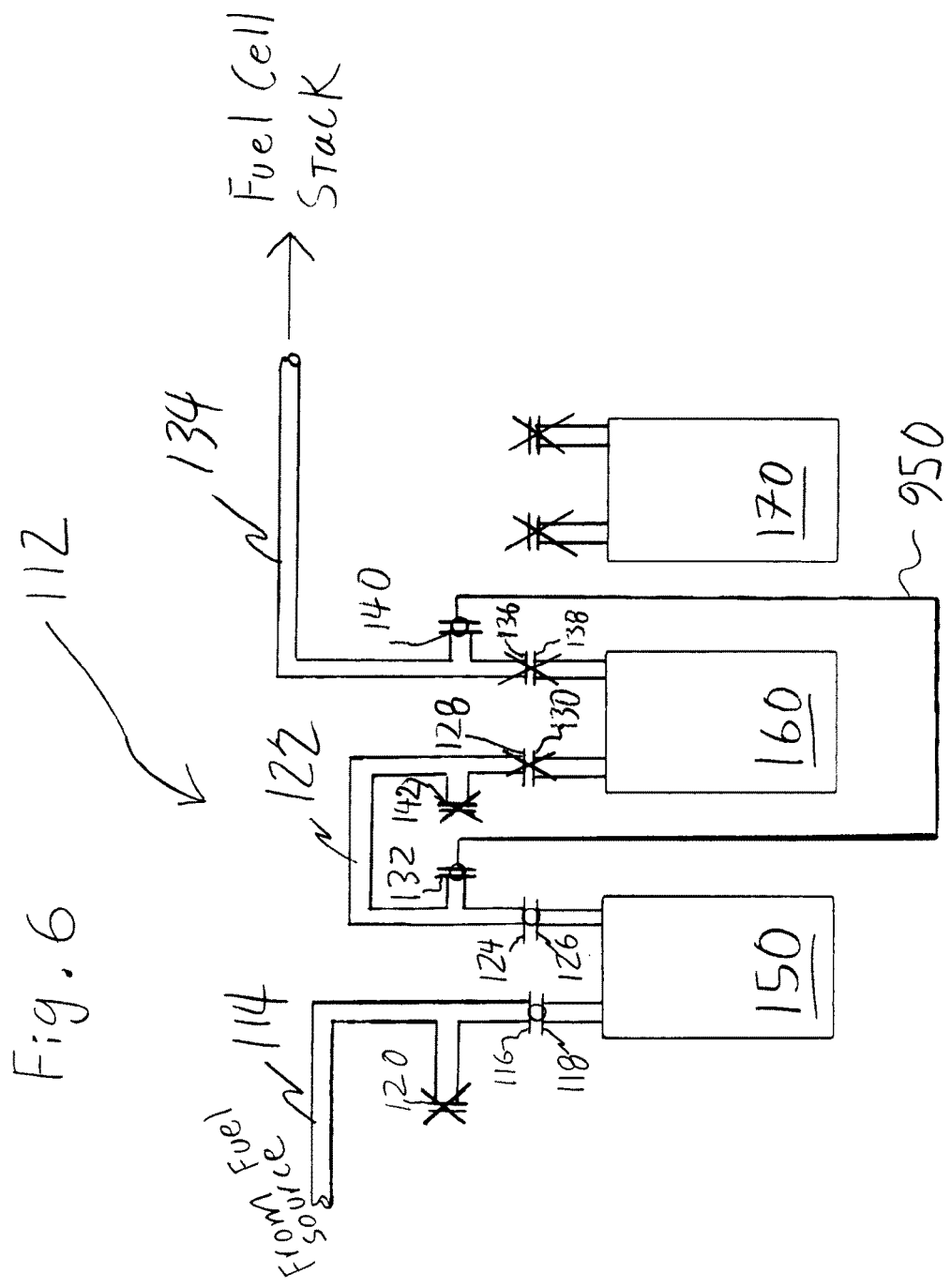

Referring to FIG. 6, in another embodiment, to bypass the second separator 160 (or its location), the second port assembly 132 (or, alternatively, port assembly 142) is fluidly coupled to the third port assembly 140 using the jumper 950 (quick connections at the ports mate with the quick connections 970 of the jumper). The second port assembly 132 is opened and the second outlet 128 is closed. When the third port assembly 140 is opened, the fuel cell system 100, with the jumper 950 in place, will be adapted to transfer fuel from the first separation unit 150 to the second conduit 134 by bypassing the second separation unit 160, the second outlet 128 and the second inlet 136, thus allowing the fuel cell stack to produce electricity because a portion of the fuel processing section 112 has been bypassed (in a recognizable manner).

In an embodiment, for N separation units, there are N+1 port assemblies or more in the fuel processing section 112. In some embodiments, with a series of separation units, there is one port assembly before the separator unit group (e.g., port assembly 120), there is one port assembly after the separator unit group (e.g., port assembly 140), and one port assembly between each separator unit of the separator group (e.g., port assembly 132). In some embodiments, there are more port assemblies (N+2, N+3, etc.), as desired. By way of example, FIG. 3 depicts the optional extra port assembly 142, although in other embodiments, port assembly 142 or port assembly 132 are not present.

In an exemplary embodiment, the jumper system provides for easy installation, removal and/or service of N separation units, by simply utilizing N+1 port assemblies. In some embodiments, the ports are quick connect port assemblies (e.g., port assemblies 120, 132, 140 and/or 142).

In an embodiment, quick connect fittings are utilized at the port assemblies. In some embodiments, the fuel processing section 112 is configured such that installation of quick connect fittings into the port assemblies 120, 132, 140 and/or 142 provide automatic shutoff isolation to the various inlets and outlets of the section 112, such that fuel can only travel through the ports 120, 132, 140 and/or 142, respectively. By way of example only and not by way of limitation, if the jumper 950 is connected to port assembly 120, the system 100 will automatically close outlet 116 without a user needing to manually close outlet 116. Further by example, if the jumper 950 is connected to the second port assembly 132, the inlet 124 will automatically be closed as well. This automatically prevents fuel from escaping through outlet 116 and outlet 124 when the first separator unit 150 is removed. In other embodiments, some or all outlets and inlets can and/or must be opened/closed manually.

In some embodiments, the port assemblies 120, 132, 140 and/or 142 utilize quick connect fittings that provide an automatic shutoff isolation when the jumper 950 is not connected to those port assemblies. That is, when the jumper 950 is removed, for example, from port assembly 120, port assembly 120 will immediately close to prevent fuel from escaping through that port. This reduces and/or eliminates the need for additional valves, etc. In some embodiments, the ports can and/or must be manually opened/closed.

Figure 7:
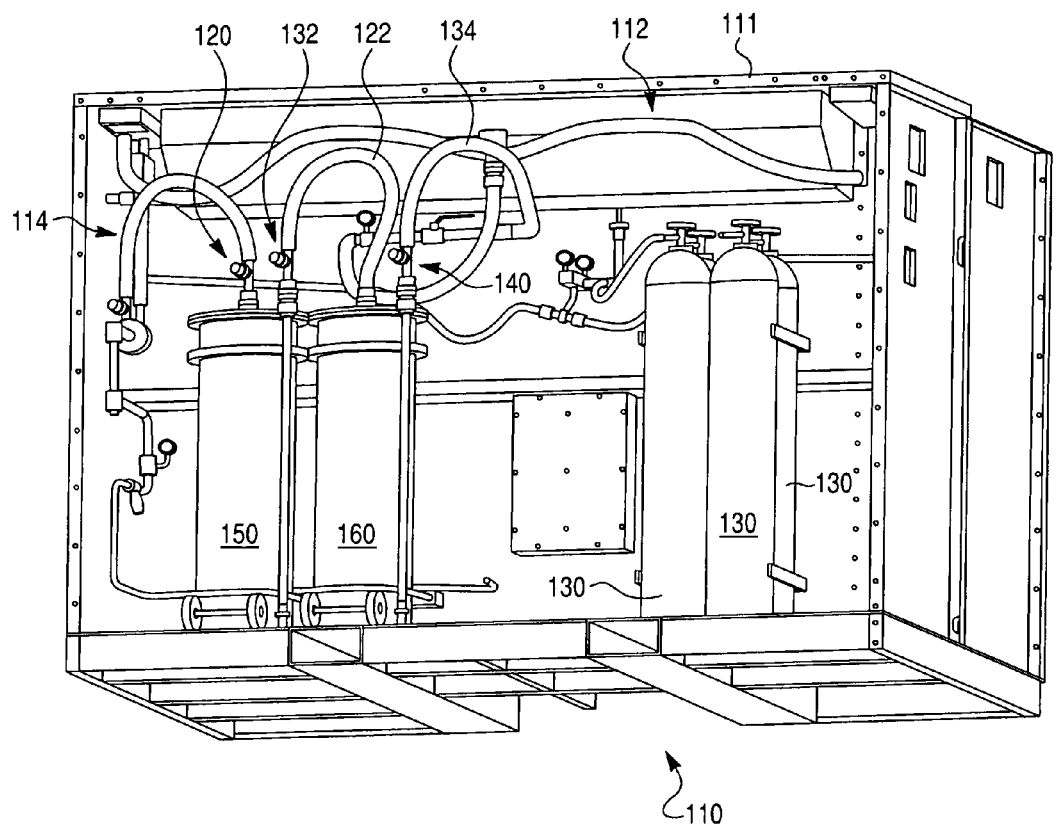
FIG. 7 depicts a three dimensional view of a fuel processing module according to an embodiment.
Figure 8:
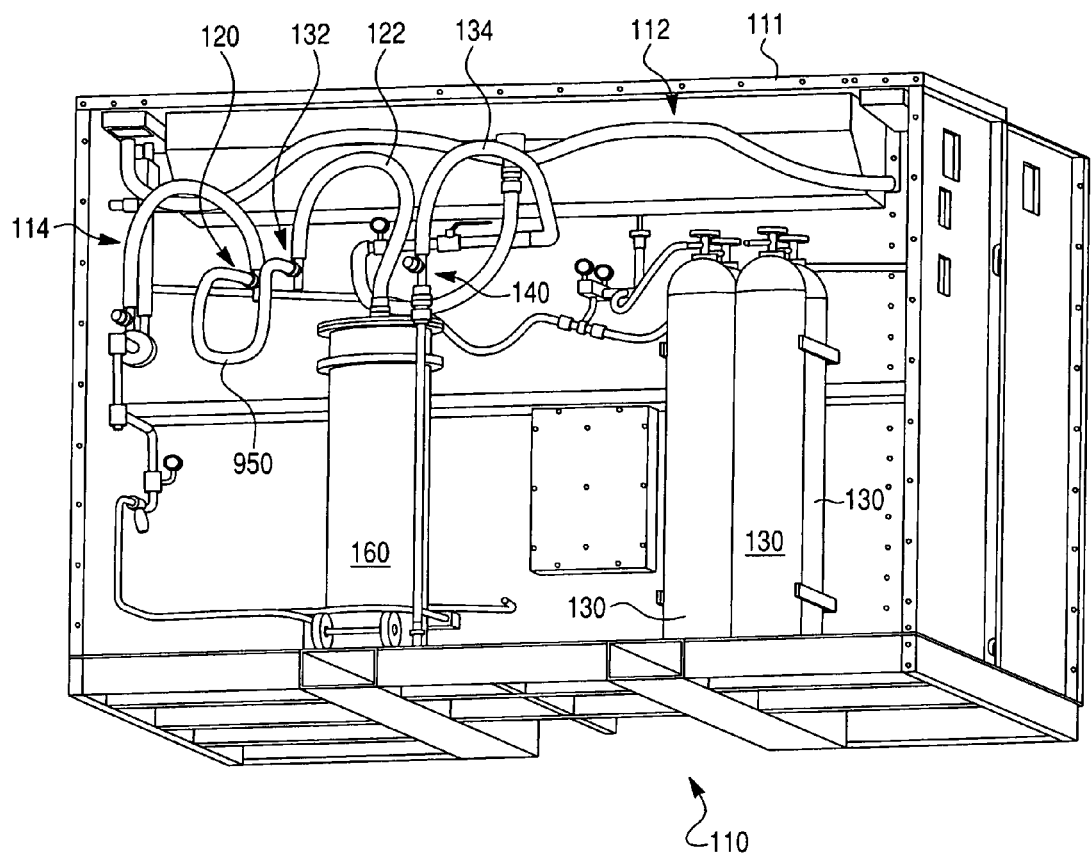
FIG. 8 depicts a three dimensional view of the jumper of FIG. 4 in use in the embodiment of FIG. 7.
Figure 9:
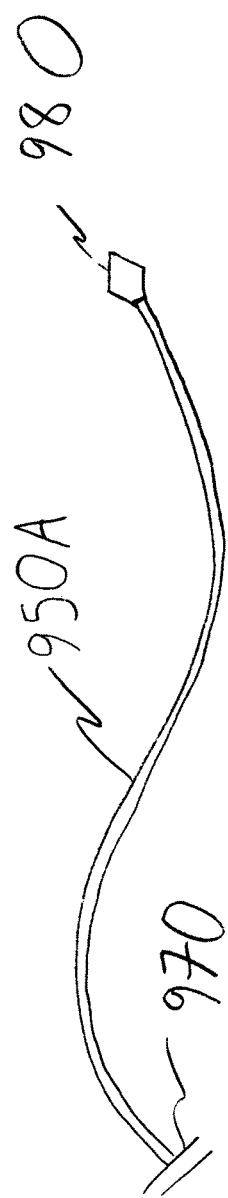
FIG. 9 depicts a schematic of a bleed device according to an embodiment.

FIGS. 7 and 8 depict, by way of example only and not by way of limitation, how some of the internal components of the fuel processing assembly 110 may be visualized in a system that utilizes the jumper system. In FIG. 7, no jumper is installed, and, as may be seen, two separation units are installed in the system, bed 1, and bed 2 (corresponding to separator units 150 and 160 detailed above). FIG. 8 depicts the jumper 950 installed. The jumper 950 "jumping" between port 1 (120) and port 2 (132), thus effectively bypassing the area where bed 1 (separator 150) was located (now removed). As may be recognized from FIGS. 7 and 8, in an embodiment, the fuel cell system 100 utilizing the jumper system provides a visual flow path for the user to determine how the fuel flows through the system. In this regard, errors that could be present as a result of opening and closing the wrong valves are reduced and/or eliminated because the user can visually trace the flow path using the jumper in the ports. In other words, "what you see is what you get," with respect to the flow path in the fuel cell system 100. That is, the operator can easily see how he or she has bypassed the various separation units. The operator can also visually see whether or not connections have been made and/or removed.

In an exemplary embodiment utilizing the port assemblies in general and utilizing quick connect fittings with those port assemblies, in particular, valves and parallel plumbing may not be utilized (e.g., such may be avoided) while still permitting service. At the same time of servicing the system, the fuel cell assembly 100 is kept running (e.g., producing power and/or fuel is being provided to the fuel cell stack 230).

In another embodiment, there is a bleed assembly 950A that contains orifices which limit the flow through the separation units during some steps of the installation and/or removal and/or maintenance process of those separation units. The assembly 950A utilizing the orifice(s) may permit slow venting of the separation units and/or permit purging of the separation units with fuel (e.g., natural gas, propane, etc.) received in into the fuel processing section 112 without creating a pressure disturbance on the rest of the system 100. A separation unit may be arranged in the system with only the upstream (inlet) quick disconnect connected to the fuel processing section 112 to permit pressurization of the separation unit. In an exemplary embodiment, bleed assembly 950A has a quick connect 970 on one end and an orifice 980 on the other end. The assembly 950A is placed on an outlet of the separation unit (e.g., outlet 126, outlet 138, etc.) and, alternatively, connected to a cabinet vent. In an embodiment, this permits a slow purging of the separation unit utilizing the fuel (which alleviates the need, in some instances, of purging with a separate fuel/needing a separate outlet for the natural gas). The jumper 950 may be utilized to bypass the separation unit to which the purge assembly 950A is connected, while the outlet that is connected to the inlet of the separation unit still outputs fuel into the separation unit, permitting the separation unit to be pressurized. Because of the bleed assembly 950A, the outflow of gas through the "open outlet" of the separation unit is limited, and, therefore, most of the fuel bypasses the separation unit through jumper 950. However, a fraction of fuel is sent into the separation unit, where the fuel cleans that separation unit. Upon completion of the purge/bleed, the assembly 950A with the orifice is then removed and the separation unit is place into service. Accordingly, an embodiment of the fuel cell system includes orifice-jumpers that are used to vent and/or purge the separation units before placing them back into service in the fuel cell system 100. In an embodiment, the orifice feature is integrated into a jumper 950, and permits a user to utilize the jumper 950 as disclosed herein, while also permitting the user to utilize the jumper 950 as the jumper 950A is utilized, as disclosed herein.

In an embodiment, the bypass system permits rapid connection and on-line service of fuel components within the fuel cell system 100.

Leak Testing

Figure 10:
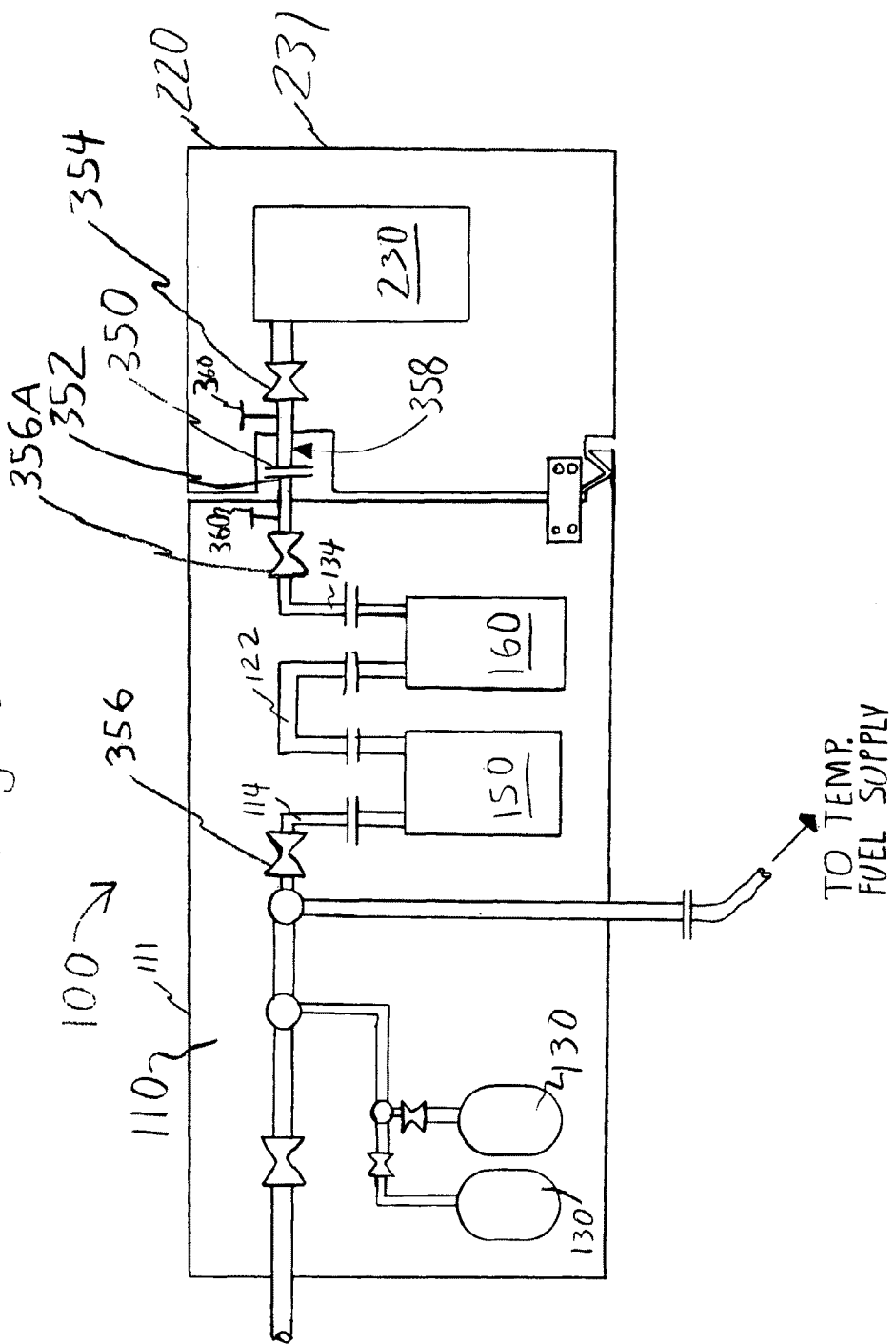
FIG. 10 depicts a schematic of the fuel cell system of FIG. 1, showing additional components (and not showing other components).

In another embodiment, leak testing may be performed on the fuel cell system 100. The hardware of fuel cell system 100 will be detailed, followed by a discussion of testing the modular fuel cell system 100 for leaks in general, and how such testing applies to a fuel cell system that includes an automatic power down mode in the event that a leak is detected or in the event that an absence of fuel is detected. FIG. 10 shows some of the structure depicted in FIG. 1, while some structure in FIG. 10 is not shown for clarity in FIG. 1. FIG. 10 also includes additional structure not shown in FIG. 1. The fuel cell system 100 includes a fuel cell module 220 including one or more fuel cell stacks 230. A quick connect fuel inlet 350 serves as a fuel inlet to fuel cell module 220 and extends through fuel cell module housing 231. The fuel cell system 100 also includes the fuel processing module 110 which includes a quick connect fuel outlet 352 extending through the fuel processing module housing 111 connected to the quick connect fuel inlet 350 so that the fuel cell module 220 is in fluid communication with the fuel processing module 110. In the embodiment of FIG. 10, the fuel cell module 220 includes a first fuel control valve 354 in fluid communication with the quick connect fuel inlet 350. The fuel processing module 110 includes a second fuel control valve 356 in fluid communication with the quick connect fuel outlet 352. In some embodiments, the second fuel control valve is installed upstream of the fuel processing section 112 (see valve 356 in FIG. 10), thus including the fuel processing section 112 in the conduit 358. In some embodiments, the second fuel control valve is installed downstream of the fuel processing conduit 112 (see valve 356A in FIG. 10), thus excluding the processing section 112 from the conduit 358.

The fuel cell system 100 includes a fuel inlet conduit 358 extending from the second fuel control valve 356 through the quick connect fuel outlet 352 and the quick connect fuel inlet 350 to the first fuel control valve 354. In FIG. 10 the second fuel control valve 356 and/or optional control valve 356A is located such that the quick connect fuel outlet 352 and the quick connect fuel inlet 350 are between the second fuel control valve 356/356A and the first fuel control valve 354. The first fuel control valve 354 is located such that the quick connect fuel outlet 352 and the quick connect fuel inlet 350 are between the first fuel control valve 354 and the second fuel control valve 356.

In an embodiment, the fuel processing module 110 and/or the fuel cell module 220 includes one or more pressure sensors 360 adapted to sense a pressure of the fuel in the fuel conduit 358, as may be seen in FIG. 10.

In an embodiment, to test for leaks, pressure change in the conduit 358 is monitored. By way of example, if after the conduit is "sealed off" (i.e., valves 354 and 356 or 356A are shut off), after a specific time, the pressure in the conduit 358 decreases, a user may determine the existence of a leak based on an identified pressure decrease. In this regard, a user may read the pressure from pressure sensors 360 to determine the pressure in the conduit 358. In an embodiment, the leak testing may be performed automatically and/or manually.

In an embodiment, fuel is utilized to test for leaks. In other embodiments, an inert gas may be used to test for leaks. Any fluid that permits adequate leak testing may be used.

In an embodiment, the control module of the system 100 includes logic to open the second fuel control valve 356 (and/or optional valve 356A) to permit a pressurized fuel to enter the conduit 358 while the first control valve 354 is shut, receives input indicative of the pressure in the conduit 358 (e.g., from sensor(s) 360) at a first predetermined time period after the second fuel control valve 356 is opened and while the first control valve 354 remains shut. The control module 500 evaluates the input indicative of the pressure in the conduit 358 at the first predetermined time period. In an embodiment, if the pressure in the conduit 358 at the first predetermined time period is indicative of a leak in the conduit 358, the control assembly 500 indicates a warning to a user (light, siren, etc.) and/or automatically prevents startup of the fuel cell system 100. In some embodiments, the valves are opened and closed manually, the control module 500 functioning to process the information received from the pressure sensors.

In an embodiment, the control module 500 includes logic to, after receiving the input indicative of the pressure in the conduit 358 at the first predetermined time period, shut the second fuel control valve 356 to trap the pressurized fuel in the conduit 358 between valves 356 and 354 (or valves 356A and 354) while the first control valve 354 is also shut. The control module 500 is configured to receive input indicative of the pressure in the conduit 358 (determined from sensor(s) 360) at a second predetermined time period after the second fuel control valve 356 is shut and while the first control valve 354 remains shut. The control module 500 includes logic to evaluate the input indicative of the pressure in the conduit 358 at the second predetermined time period, and if the pressure in the conduit 358 at the second predetermined time period is indicative of a leak in the conduit 358, the control assembly 500 indicates a warning to a user and/or automatically prevents startup of the fuel cell system.

In an embodiment, if no additional testing is desired, the control module 500 is further configured to, after receiving the input indicative of the pressure in the conduit 358 at the first predetermined time period, open the first control valve 354, and, if the second control valve 356/356A is not opened, to permit the pressurized fuel to flow to the fuel cell stack 230 and permit the fuel cell system 100 to start up (i.e., start generating power). The control assembly 500 is configured to receive input indicative of the pressure in the conduit 358, outputted from sensor(s) 360 at a third predetermined time period after the first fuel control valve 354 is opened. The control assembly 500 is configured to evaluate the input indicative of the pressure in the conduit 358 during a temporal period extending from after the first time period, and if the pressure in the conduit 358 during the temporal period extending from after the first time period is indicative of a leak in the conduit 358, indicate a warning and/or shut down the fuel cell system 100. In some embodiments, the control assembly 500 constantly monitors the pressure in the conduit 358 while the fuel cell system 100 is operating.

In an embodiment, the control assembly (also control module) 500 is further configured to, after receiving the input indicative of the pressure in the conduit 358 at the second predetermined time period, open the first control valve 354 and the second control valve 356 to permit the pressurized fuel to flow to the fuel cell stack 230 and permit the fuel cell system 100 to start up. The control assembly 500 receives input indicative of the pressure in the conduit 358 at a third predetermined time period after the first fuel control valve 354 and the second fuel control valve 356 is opened, and evaluates the input indicative of the pressure in the conduit 358 during a temporal period extending from after the second time period, and if the pressure in the conduit 358 during the temporal period extending from after the second time period is indicative of a leak in the conduit, indicate a warning and/or shut down the fuel cell system.

It is noted that while in the embodiment just described, the control assembly 500 (or 501) automatically opens and closes the pertinent valves, and automatically evaluates the pressure (s) and determines whether or not a leak is present (although in some embodiments, as may have already been inferred, the automatic process may be initiated by a user). However, in some embodiments, a user can open (and/or shut) the second fuel control valve 356 to permit the pressurized fuel (fuel) to enter the conduit 358 while the first control valve 354 is shut, and the user can open (and/or shut) the first control valve 354 to permit the pressurized fuel to travel to the fuel cell stack 230.

In some embodiments, a user manually opens and closes the valves, and manually evaluates information outputted by the system 100 indicative of the pressure in the conduit 358 after the various valves are opened and/or shut.

In some embodiments, pressure sensors may output information indicative of about an exact pressure, and/or may output information indicative of a range of pressures, and/or output go/no-go information indicative of the pressure in the conduit 358 (the same is the case with respect to other sensors disclosed herein, as well). In some embodiments, the fuel cell system 100 outputs information indicative of whether an acceptable pressure is in the conduit 358 to commence start up of the fuel cell system and/or whether an unacceptable pressure in the conduit 358 exists which is indicative of not commencing start up of the fuel cell system, after the various valves are opened/shut as detailed herein to perform the various leak tests. This outputted information may be outputted automatically and/or outputted upon prompting of the user.

Figure 11:
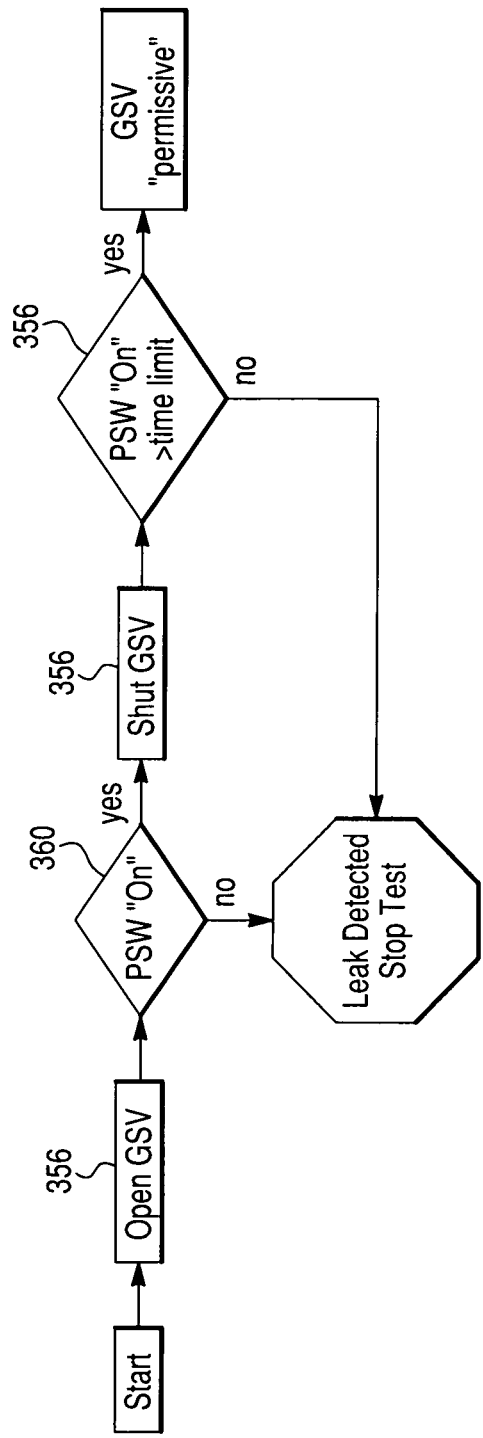
FIG. 11 depicts an algorithm flow diagram according to an embodiment.

An embodiment includes algorithms for determining whether a leak exists in the conduit 358. FIG. 11 presents one such algorithm, where GSV refers to Gas Supply Valve (e.g., valve 356/356A), and PSW refers to Pressure Switch(s) 360 (a pressure sensor that, in some embodiments, outputs a binary go/no-go signal). In this regard, an embodiment includes a method of testing for leaks in the fuel cell system 100, which entails connecting the fuel inlet 350 to the fuel outlet 352 to place the fuel cell module 220 into fluid communication with the fuel processing module 110, thereby creating the fuel conduit 358 extending between the fuel cell module 220 and the fuel processing module 110 and extending through the connection. The method further includes closing off, either manually or automatically, a first end of the fuel conduit 358, where the first end is located in the fuel cell module 110. A fuel processed by the processing section 112 is permitted to flow from a fuel source (e.g., the processing section 112) into the fuel conduit 358 from the fuel processing module 110 through the connection to the fuel cell module 220 so that the fuel reaches the first end of the conduit 358 (e.g., the valve 354). A first pressure of the fuel that has flown into the fuel conduit 358 is sensed using one or more of the pressure sensors 360, manually or automatically, while the first end is closed off and while the fuel conduit 358 is open to the fuel. The method also includes determining, manually or automatically, whether the sensed first pressure in the fuel conduit 358 is indicative of a leak in the fuel cell system. (High pressure is indicative of no leak, while low or no pressure is indicative of a leak.)

The leak test/leak check system may include, in an embodiment, at least one remotely operated valve (which may be a solenoid valve), a pressure sensor (which may be a pressure switch, in some embodiments), and shut-off valves for each fuel cell module. In an embodiment, to initiate the leak test/leak check, a user may push a button on the fuel cell system, 100, and/or commands it to start via software. In an embodiment, leak testing is performed automatically, and, accordingly, the fuel cell system 100 can include hardware, software and/or firmware to automatically or semi-automatically control leak testing.

The method further includes closing off a second end of the fuel conduit 358 by closing valve 356, either manually or automatically, such that the second end is located in the fuel processing module and. A second pressure of the fuel in the fuel conduit 358 is determined (either automatically or by a user analyzing output from sensor(s) 360) while the first end is closed off and while second end is closed off, and determining, whether the sensed second pressure in the fuel conduit is indicative of a leak in the fuel conduit 358. (High pressure being indicative of no leak, while low pressure or no pressure is indicative of a leak.) The method can also include the actions of opening the first end and/or the second end of the fuel conduit 358 by opening valve 354 and/or 356 so that fuel flows from the fuel source through the fuel conduit 358 to the fuel cell stack 230, sensing a third pressure of the fuel in the fuel conduit 358 while the fuel is flowing from the fuel source through the fuel conduit 358 to the fuel cell stack 230, and determining whether the sensed third pressure in the fuel conduit 358 is indicative of a leak in the fuel cell system 110. (High pressure being indicative of no leak, while low pressure or no pressure is indicative of a leak.) These actions can be done manually and/or automatically.

The purpose of sensing the pressures is to determine whether the fuel cell system 100 should be started up and/or shut down due to unacceptable leaking. In this regard, the fuel cell system 100 is configured to be automatically shut down/prevented from starting up in the event that one or more of the various pressures sensed is indicative of an unacceptable leak.

In an embodiment utilizing the leak-check routine just described, significant time and cost reductions and safety improvements during field use and/or installation may be realized. In an embodiment, an optional orifice 115 (see FIG. 3) may be interposed between the fuel source and the fuel processing section 112. This orifice creates a pressure drop by limiting flow to the conduit 358. In some embodiments, a tracer gas, such as helium, etc., may be used during leak testing instead of fuel. Sensors other than pressure sensors may be used in the leak test routine.

In some embodiments, both valve 356 and 356A are utilized. In an exemplary embodiment, the valves are utilized to further isolate the leak. In this regard, the routines detailed herein may be practiced by appropriately opening and closing valves 356 and 356A.

An embodiment of the leak test/leak monitoring system includes cost and time advantages, and is conducive to a modular system design, shipment and installation of the fuel cell system 100. Installation time of the system and/or modules is decreased, because, in an exemplary embodiment, each deployed system does not require field inspections from a certifying agency.

Alignment System

Figure 12:
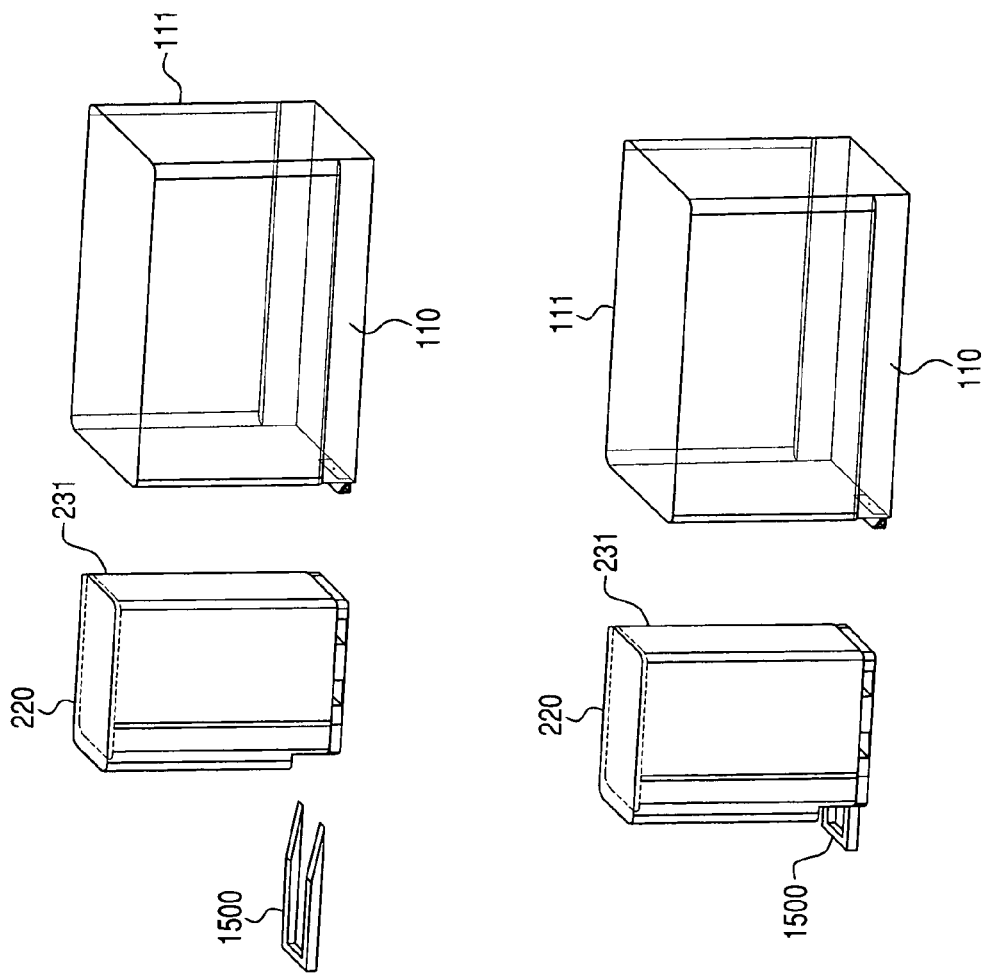

Another embodiment includes an alignment system 700, such as a quick connect alignment system. Exemplary utility of the alignment system will first be discussed, with reference to exemplary scenarios of use of the alignment system 700, followed by some exemplary descriptions of the structure of the alignment system 700. The alignment system 700 permits one fuel cell module of a fuel cell system to be efficiently installed to and sufficiently connected (e.g., it prevents the module from moving out of place once installed) to and to be efficiently removed from a second module when, for example, the first module is brought to/taken away from the second module with a forklift. The example below describes how a fuel cell module 220 can be efficiently installed to and sufficiently connected (e.g., it prevents the fuel cell module 220 from moving out of place once installed) to and to be efficiently removed from the fuel processing module 110 when, for example, the fuel cell module 220 is brought to/taken away from the fuel processing module 110 with a forklift. However, it should be noted that other module combinations may be used, such as installing and removing any one of fuel cell, fuel processing and power conditioning modules onto any one more of fuel cell, fuel processing and power conditioning modules. FIG. 12, which depicts a forklift fork 1500 approaching and then entering fuel cell module 220 to lift module 220 and move it proximate to processing module 110. FIG. 13, depicts the fuel cell module 220 lifted by forks 1500, being moved proximate to fuel processing module 110, so it may be lowered into place. FIGS. 14a and 14b present additional views of the fuel cell module 220 and the fuel processing module 110 with the alignment system 700 in the final portions of movement of the fuel cell module 110 as the fuel cell module 220 is brought to the fuel processing module 110.

The quick connect alignment system 700 guides and captures the fuel cell module 220/the housing 231 of fuel cell module 220 as the fuel cell module 220 is moved in the direction of gravity (e.g., downward) to rest on a fuel cell module support 221 (e.g., a concrete floor, a steel platform, leveled ground, etc.) which may be shared by (i.e., also supports) the fuel processing module 110, so that the fuel cell module 220/the housing 231 of the fuel cell module has a specific orientation with respect to the fuel processing module 110 and resists movement from the specific orientation with respect to the fuel processing module 110. In this regard, in an embodiment, referring to FIGS. 15 and 16, the alignment system 700 is adapted to render the fuel cell module aligned in the X and Y axis, with the fuel processing module 110 as the fuel cell module is moved in the direction of gravity onto the fuel cell module support. As may be seen in FIGS. 15 and 16 (FIG. 16 being a side view of the fuel cell system 100 depicted in FIG. 15 looking from the side of the fuel cell module 220), the X axis and Y axis are Cartesian coordinates orthogonal to each other, and the X axis and Y axis are both orthogonal to the direction of gravity, the Z axis in the Cartesian coordinate system depicted in FIGS. 15-16. The alignment system 700 is adapted to render the fuel cell module 220 aligned in the Z axis as well, once the fuel cell module 220 is at least substantially supported by the fuel cell module support and after the movement of the fuel cell module in the direction of gravity (Z axis in the figures) is halted by the fuel cell module support 221.

While FIGS. 12 and 13 depict the fuel cell module 220 being manipulated relative to stationary fuel processing module 110, in other embodiments, fuel cell module 110 may be manipulated relative to stationary fuel cell module 220.

The alignment system 700 comprises a device that is adapted to guide the fuel cell module 220 as it is moved in the direction of gravity (e.g., by a forklift) onto the fuel cell module support 221 and adjacent to the fuel processing module 110. In an exemplary embodiment, a center of gravity of the fuel cell module 220 is moved with respect to both the X and the Y axis after a portion 710 of the alignment system 700 on the fuel cell module 220 comes into contact with a portion 720 of the alignment system 700 on the fuel processing module 110 as the fuel cell module 220 is moved in the direction of gravity. Any other component of the fuel cell module 220 that may be utilized as a reference point, such as, for example, an end edge of the fuel cell module 220 measured in Cartesian coordinates, as described below. That is, the alignment system 700 is configured to direct the movement of the fuel cell module 220 after the fuel cell module 220 contacts the fuel processing module 110. In some embodiments, this occurs completely before the fuel cell module 220 contacts the support 221, while, in other embodiments, this occurs after the fuel cell module 220 contacts the support 221 (e.g., it may drag the fuel cell module 220 across the support 221 in the X-Y plane). Accordingly, the phrase and derivations of the phrase "as the fuel cell module is moved in the direction of gravity" include scenarios where no part of the fuel cell module 220 has contacted the support and where a portion of the fuel cell module 220 has contacted the support 221.

The functionality of the alignment system may be described with reference to Cartesian coordinates. In this regard, the fuel cell system 100 has a coordinate system having an X axis and Y axis. As in the traditional Cartesian coordinate system, the X axis and Y axis are orthogonal to each other and the X axis and Y axis are both orthogonal to the Z axis, which is the direction of gravity. In an embodiment, the alignment system 700 is utilized to guide the fuel cell module 220 when it is moved to the fuel processing module 110 so that the fuel cell module 220 is ultimately positioned on the fuel cell module support 221 with a desired orientation in the X and Y axis relative to the fuel processing module 110. When the fuel cell module support is shared by the fuel processing module 110 and the fuel cell module 220, and the support 221 is an industrially prepared floor (e.g., a concrete floor), the alignment in the Z axis (direction of gravity) can occur irrespective of the use of the alignment system. In this regard, the alignment system still can be considered to also align the fuel cell module in the Z axis as well. The desired orientation is an orientation as may be seen in the Figs. The desired orientation may be an orientation such that the fuel cell module 220 is proximate enough to the fuel processing module 110 such that the fuel cell module 220 may be placed into fluid communication with the fuel processing module 110 (and/or visa-versa).

The utility of the alignment system 700 may be seen when the fuel cell module 220, as it is lowered onto the support to be placed proximate to the fuel processing module 110 by, for example, a forklift, is in second orientation, different than the desired first orientation with respect to the X and Y axis. Once the portion 710 of the alignment system 700 of the fuel cell module 220 contacts the portion 720 of the alignment system 700 of the fuel processing module 110, the alignment system 700 forces the fuel cell module 220 to be moved to the first desired orientation as the fuel cell module 220 is moved in the direction of gravity. In an exemplary embodiment, once the fuel cell module 220 "bottoms out" on the support, the alignment system 700 will have guided (i.e., moved) the fuel cell module 200 to the desired orientation.

During movement from the second orientation to the desired first orientation (the desired orientation) the movement of the fuel cell module has a component in the X axis when the first orientation and the second orientation do not have the same X component, the alignment system 700 will move the fuel cell module 220 in the X direction if the module is not aligned in the X direction as it is lowered (e.g., if the module 220 is 1 inch "too much" to the left in the X direction, the alignment system 700 will guide the fuel cell module 220 1 inch to the right). The alignment system 700 will move the fuel cell module 220 in the Y direction if the module is not aligned in the Y direction as it is lowered (e.g., if the module 220 is 0.5 inches "too much" to the right in the Y direction, the alignment system 700 will guide the fuel cell module 220 0.5 inches to the left).

In an exemplary embodiment, the alignment system 700 has a configuration as seen in FIGS. 17-21. According to this exemplary embodiment, the alignment system 700 includes a portion 710 of the system on the fuel cell module 220 attached to or part of the fuel cell module housing 231 and a separate portion 720 of the system on the fuel processing module 110 attached to or part of the fuel processing module housing 111. Portion 710 includes a first male portion 730 extending from the fuel cell module 220, and portion 720 includes a first female portion 740 connected to the fuel processing module 110. These components, referring to the Cartesian coordinates presented on the right side of FIG. 16, guide the fuel cell module 220 in the X axis. Specifically, these components "pull" the fuel cell module 220 towards the fuel processing module 110 as the fuel cell module 220 is moved downward in the Z axis (in the direction of gravity) in the event of misalignment in the X axis, and, once the fuel cell module 220 is seated on the support, the first male portion 730, when seated in the first female portion 740, is adapted to prevent the fuel cell module from moving in the X axis (i.e., prevents the fuel cell module 220 from moving away from the fuel processing module 110).

Figure 18:
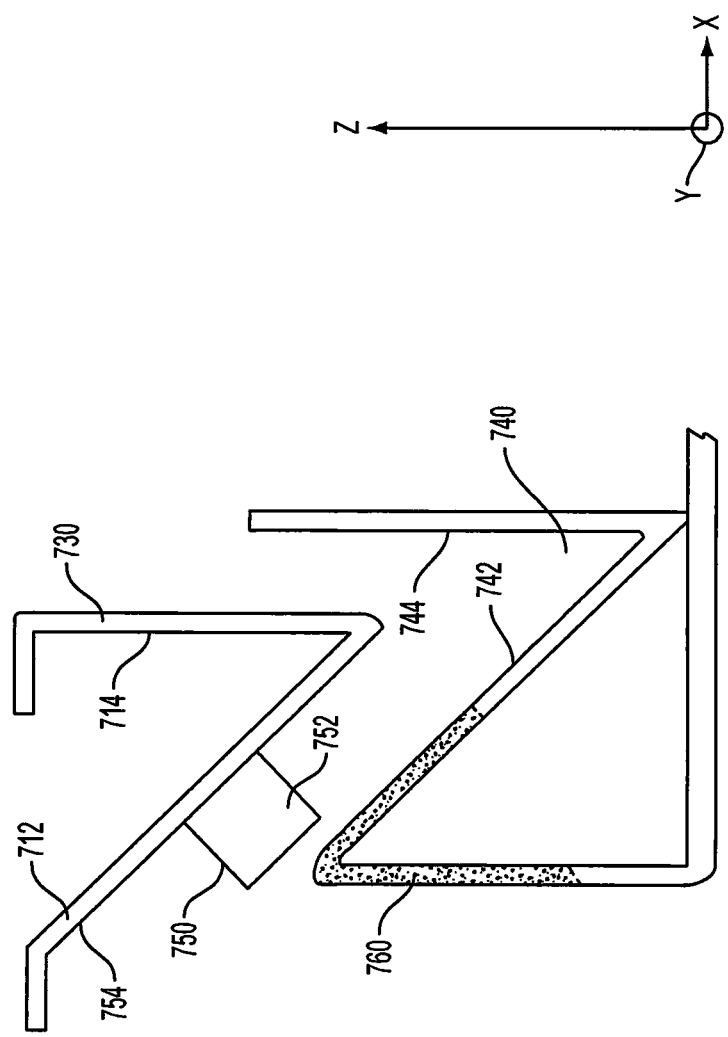

Referring to FIGS. 17 and 18, as may be seen, the first male portion 730 has an outer cross section, when taken in a first plane lying in the direction of gravity, in the form of a wedge. The first female portion 740 has an inner cross section, when taken on the first plane, that conforms to the wedge. The second male portion 750, in the embodiment of FIGS. 17 and 18, includes a cylindrical portion extending away from a face of the first male portion 730 (although in other embodiments, the portion 750 may include protrusion that has a triangular shaped cross-section, and may include any shape that will permit alignment and securement as detailed herein). This cylindrical portion includes a bearing section 752 that extends away from a surface 754 of the first male portion 730.

It is noted that in other embodiments, the first male portion 730 may be located on the fuel processing module 110, and the first female portion 740 may be located on the fuel cell module 220.

As may be seen in FIGS. 17-21, the alignment system 700 includes a second male portion 750 that extends from the first male portion 730 (although in other embodiments, it can extend from the first female portion 740) and a second female portion 760 in the first female portion 740 (although in other embodiments, it can extend from the first male portion 730). The second male portion 750, when in contact with the second female portion 760, is adapted to guide the fuel cell module 220 to align it along the Y axis. In this regard, the second male portion 750, when seated in the second female portion 760, and when seated on the support, is adapted to prevent the fuel cell module 220 from moving along the Y axis (i.e., prevents the fuel cell module 220 from moving from side to side, relative to the fuel processing module 110).

The second female portion is adapted to receive the second male portion simultaneously as the first female portion receives the first male portion. The second female portion has a geometry that closes around the second male portion as the second male portion travels toward the second female portion and as the first male portion travels toward the first female portion to be seated in the first female portion.

Referring to FIGS. 17 and 18, as may be seen, the first male portion 730 has an outer cross section, when taken in a first plane lying in the direction of gravity, in the form of a wedge. The first female portion 740 has an inner cross section, when taken on the first plane, that conforms to the wedge. The second male portion 750, in the embodiment of FIGS. 17 and 18, includes a cylindrical portion extending away from a face of the first male portion 730 (although in other embodiments, the portion 750 may include protrusion that has a triangular shaped cross-section, and may include any shape that will permit alignment and securement as detailed herein). This cylindrical portion includes a bearing section 752 that extends away from a surface 754 of the first male portion 730.

The second female portion 760 is a channel that narrows in the direction of movement of the second male portion toward 750 the second female portion 760, which is depicted by arrow "I" in FIG. 18, which depicts a view of the portion 720 of the alignment system 700 on the fuel processing module 110, and is normal to the axis of the cylindrical section of the second male portion 750. The channel 760 contacts the bearing section 752 as the second male portion 750 is moved towards the second female portion 760. The channel, as it narrows, guides the second male portion 750 in the Y axis (left or right in FIG. 18), thus aligning the fuel cell module 220 along the Y axis.

Referring to FIG. 18, in an exemplary embodiment, the first male portion 710 has a first 712 and second 714 planar component extending generally uniformly in a first direction (in the Y axis) a distance more than about twice the length of the first male portion 730 in the direction of gravity (the Z axis, the "height of the first male portion 730). The first male portion 730 has a right triangular shape outer cross-section when viewed on the plane of FIG. 18. That is, on first plane normal to the first direction (the Y axis) and lying on the direction of gravity (the Z axis). The first female portion 740 has third 742 and fourth 744 planar component extending generally uniformly in a second direction (the Y axis) a distance more than about twice the length of the first female portion 740 in the direction of gravity (the Z axis, the "height" of the first female portion 740). The first female portion 740 has a right triangular shape inner cross-section with one leg open when viewed on a second plane normal to the second direction (the Y axis) and lying on the direction of gravity (the Z axis)—the view of FIG. 17. The inner cross-section of the first female portion 740 substantially conforms to two sides of the outer portion of the outer cross-section of the first male portion 730 when the first male portion 730 is seated in the first female portion 740.

In an embodiment, portion 710 is geometrically fits over portion 720 such that, when at rest, both portions are flush and constrained in a predetermined xyz point of attachment as shown in the Figures. During installation of the fuel cell module 220, by forklift for example, portion 710 can be off-center a prescribed distance in all xyz directions while portion 710 is above portion 720. This minimizes installation error and increases installation efficiency. The triangular geometry of the components takes advantage of being both a vertical and front-to-back lead-in and provides motion constraint. The cutout 760 in portion 720 acts as a lead in for side-to-side movement while the cylindrical protrusion 750 acts as a motion constraint from side-to-side once in place.

Figure 15:
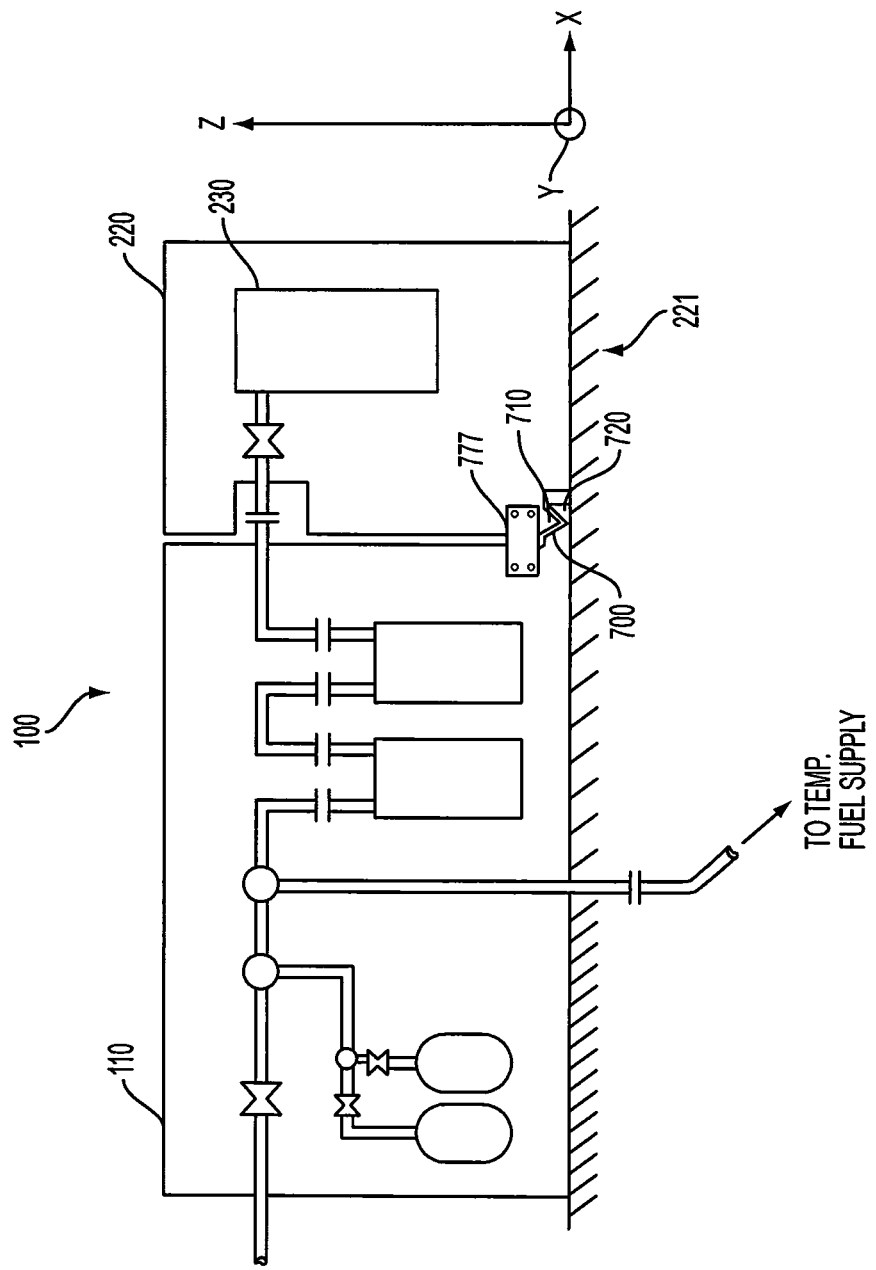
FIG. 15 depicts a schematic of the fuel cell system of FIG. 1, showing additional information.
Figure 16:
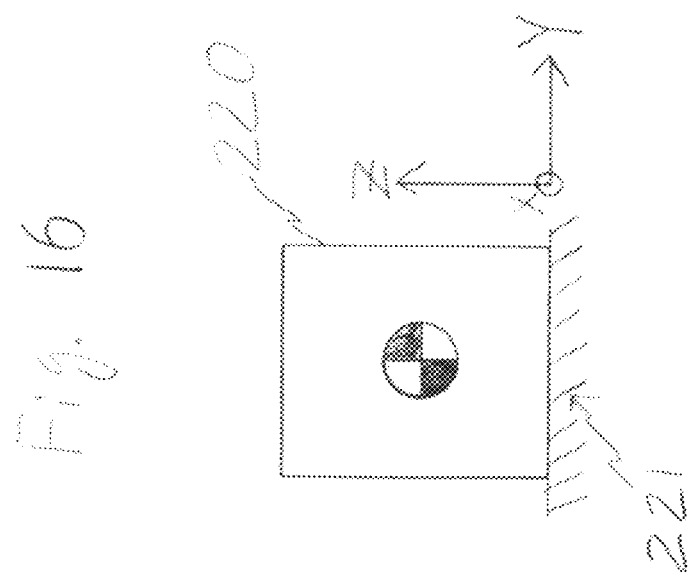
FIG. 16 depicts a schematic of a side view of the fuel cell system of FIG. 15, where the fuel cell module eclipses the fuel processing module.

In some embodiments, the fuel cell module 220 is not positively retained to the fuel processing module 110. In other embodiments, the fuel cell system 100 includes a structural link 777 adapted to structurally link the fuel cell module 220 to the fuel processing module 110, as seen in FIG. 15. In an exemplary embodiment, the structural link 777 is a metal plate that is removably bolted to the fuel cell module 220 and the fuel processing module 110. One or more structural links 777 may be included in the fuel cell system 100.

In some embodiments, a second alignment system is included in the fuel cell system (to, for example, capture and retain an upper portion of the fuel cell module 220). In some embodiments, the alignment system 700 is bifurcated at the bottom.

In an exemplary embodiment, the geometry of the alignment system allows for xyz lead-in and xyz constraint once installed. The xyz constraint, in some embodiments, permits two directions to be fixed by the geometry alone while the third direction is fixed by gravity and frame-bolts.

In an exemplary embodiment, the alignment system is adapted to permit a single forklift operator manipulating the fuel cell module with a forklift to align the fuel cell module with the fuel processing module without guidance from another person.

In an exemplary embodiment, the alignment system may have a different configuration than that depicted in the Figures. By way of example only and not by way of limitation, in some embodiments, the male portion 720 comprises one or more conical sections, and the female portion comprises corresponding one or more female conical sections. Any configuration that will permit alignment and retention/securement as detailed herein may be practiced.

Some embodiments include logic devices including logic which permit automatic and semi-automatic execution of some or all of the teachings detailed herein, this logic may include hardware (including mechanical structures), software and/or firmware, these logic devices sometimes being control assemblies including processors and/or microprocessors, etc., that include hardware, software and/or firmware.

In an embodiment as described herein, quick connect fittings are used in some and/or all of the connection fittings presented herein. In an embodiment, some or all of the valves are solenoid valves which may be remotely operated by a user (manually) and/or by a control unit.

Features of any above embodiments or figures may be used in combination with any one or more other features of the above embodiments of figures.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

The teachings herein can be practiced with fuel cell systems including fuel processing assemblies and fuel cell assemblies as disclosed in U.S. patent application Ser. No. 11/656,006, filed on Jan. 22, 2007, to K. R. Sridhar, entitled Modular Fuel Cell System, and U.S. patent application Ser. No. 11/656,563, filed on Jan. 23, 2007, to Jeroen Valensa, entitled Integrated Solid Oxide Fuel Cell and Fuel Processor, the contents of these applications relating to processing fuel and generating electricity with a fuel cell stack and the fuel cell system being incorporated herein by reference in their entirety, as those teachings may be utilized in the fuel processing assemblies/modules and fuel cell assemblies/modules described herein.

What is claimed is:

1. A method of performing maintenance on a fuel cell system including a fuel processing assembly that includes a plurality of separation units adapted to purify a fuel, the method comprising the following actions, all of which are performed while the fuel cell system is generating electricity by receiving a purified fuel from the fuel processing assembly:
   redirecting the fuel to bypass one or more of the separation units so that the fuel may be received by other separation units;
   removing or servicing one or more of the one or more bypassed separation units providing the fuel through a first conduit which comprises a first bypass port and a first outlet port which is connected to an inlet port of a first separation unit of the plurality of separation units;
   providing the fuel from the first bypass port into a jumper, providing the fuel from the jumper into a second bypass port located in a second conduit;
   providing the fuel from the second conduit through a second outlet port into an inlet port of a second separation unit of the plurality of separation units; and
   providing the fuel from an outlet port of the second separation unit into a third inlet port of a third conduit which further comprises a third bypass port, and
   wherein the step of redirecting the fuel to bypass one or more separation units comprises connecting the jumper with quick connect fittings on two ends of the jumper to the first and second bypass ports and halting flow of fuel to the one or more bypassed separation units.

2. The method of claim 1, further comprising the following actions, all of which are performed while the fuel cell system is generating electricity by receiving a purified fuel from the fuel processing assembly:
   removing one or more of the one or more bypassed separation units; and
   installing one or more separation units in a location previously occupied by the removed one or more bypassed separation units.

3. The method of claim 2, further comprising the following actions, all of which are performed while the fuel cell system is generating electricity by receiving a purified fuel from the fuel processing assembly:
   redirecting the fuel through the installed one or more separation units.

4. The method of claim 1, wherein the separation units are adapted to desulfurize the fuel.

5. The method of claim 1, wherein there are N separation units and N+1 bypass ports in a fuel circuit encompassing the separation units.

6. The method of claim 1, further comprising inserting the jumper into the first bypass port to automatically close the first outlet port, and removing the jumper from the first bypass port to automatically open the first outlet port.

7. The method of claim 1, further comprising:
   inserting the jumper into the first bypass port and closing the first outlet port; and
   removing the jumper from the first bypass port and opening the first outlet port.

8. A method of performing maintenance on a fuel cell system including a fuel processing assembly that includes a plurality of separation units adapted to purify a fuel, the method comprising the following actions, all of which are performed while the fuel cell system is generating electricity by receiving a purified fuel from the fuel processing assembly:
- redirecting the fuel to bypass one or more of the separation units so that the fuel may be received by other separation units;
- removing or servicing one or more of the one or more bypassed separation units;
- providing the fuel through a first conduit which comprises a first bypass port and a first outlet port which is connected to an inlet port of a first separation unit of the plurality of separation units;
- providing the fuel from the first bypass port into a jumper;
- providing the fuel from the jumper into a second bypass port located in a second conduit;
- providing the fuel from the second conduit through a second outlet ort into inlet ort of a second separation unit of the plurality of separation units; and
- providing the fuel from an outlet port of the second separation unit into a third inlet port of a third conduit which further comprises a third bypass port, and
- wherein there are N separation units and N+1 bypass ports in a fuel circuit encompassing the separation units.

9. The method of claim 8, further comprising the following actions, all of which are performed while the fuel cell system is generating electricity by receiving a purified fuel from the fuel processing assembly:
- removing one or more of the one or more bypassed separation units; and
- installing one or more separation units in a location previously occupied by the removed one or more bypassed separation units.

10. The method of claim 9, further comprising the following actions, all of which are performed while the fuel cell system is generating electricity by receiving a purified fuel from the fuel processing assembly:
- redirecting the fuel through the installed one or more separation units.

11. The method of claim 8, wherein the separation units are adapted to desulfurize the fuel.

12. The method of claim 8, further comprising inserting the jumper into the first bypass port to automatically close the first outlet port, and removing the jumper from the first bypass port to automatically open the first outlet port.

13. The method of claim 8, further comprising:
- inserting the jumper into the first bypass port and closing the first outlet port; and
- removing the jumper from the first bypass port and opening the first outlet port.

14. A method of performing maintenance on a fuel cell system including a fuel processing assembly that includes a plurality of separation units adapted to purify a fuel, the method comprising the following actions, all of which are performed while the fuel cell system is generating electricity by receiving a purified fuel from the fuel processing assembly:
- providing the fuel through a first conduit which comprises a first bypass port and a first outlet port which is connected to an inlet port of a first separation unit of the plurality of separation units;
- providing the fuel from the first bypass port into a jumper to redirect the fuel to bypass the first separation unit so that the fuel may be received by a second separation unit of the plurality of separation units;
- providing the fuel from the jumper into a second bypass port located in a second conduit;
- providing the fuel from the second conduit through a second outlet port into inlet port of the second separation unit;
- providing the fuel from an outlet port of the second separation unit into a third inlet port of a third conduit which further comprises a third bypass port; and
- removing or servicing the bypassed first separation unit.

15. The method of claim 14, further comprising the following actions, all of which are performed while the fuel cell system is generating electricity by receiving a purified fuel from the fuel processing assembly:
- removing the bypassed first separation unit; and
- installing a replacement separation unit in a location previously occupied by the removed bypassed first separation unit.

16. The method of claim 15, further comprising the following actions, all of which are performed while the fuel cell system is generating electricity by receiving a purified fuel from the fuel processing assembly:
- redirecting the fuel through the installed replacement separation unit.

17. The method of claim 14, wherein the separation units are adapted to desulfurize the fuel.

18. The method of claim 14, wherein there are N separation units and N+1 bypass ports in a fuel circuit encompassing the separation units.

19. The method of claim 14, further comprising inserting the jumper into the first bypass port to automatically close the first outlet port, and removing the jumper from the first bypass port to automatically open the first outlet port.

20. The method of claim 14, further comprising:
- inserting the jumper into the first bypass port and closing the first outlet port; and
- removing the jumper from the first bypass port and opening the first outlet port.

21. The method of claim 14, further comprising attaching a bleed assembly having an orifice to an outlet of the bypassed first separation unit and purging the bypassed first separation unit.

* * * * *